United States Patent [19]
Morriss et al.

[11] Patent Number: 5,909,556
[45] Date of Patent: *Jun. 1, 1999

[54] M&A FOR EXCHANGING DATE, STATUS AND COMMANDS OVER AN HIERARCHICAL SERIAL BUS ASSEMBLY USING COMMUNICATION PACKETS

[75] Inventors: Jeff Charles Morriss, Boulder Creek, Calif.; Shaun Knoll, Portland, Oreg.; Puthiya Kottal Nizar, El Dorado Hills, Calif.; Richard M. Haslam, Hillsboro, Oreg.; Ajay V. Bhatt, El Dorado Hills, Calif.; Sudarshan Bala Cadambi, Portland, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/980,507

[22] Filed: Dec. 1, 1997

Related U.S. Application Data

[63] Continuation of application No. 08/619,863, Mar. 19, 1996, Pat. No. 5,694,555, which is a continuation of application No. 08/332,573, Oct. 31, 1994, abandoned.

[51] Int. Cl.$^6$ ........................................................ G06F 13/00
[52] U.S. Cl. .................................... 395/280; 395/309
[58] Field of Search ................................. 395/280, 285, 395/287, 309

[56] References Cited

U.S. PATENT DOCUMENTS 5,341,480  8/1994  Wasserman et al. ................. 395/287
5,694,555  12/1997  Morriss et al. ........................ 395/280

OTHER PUBLICATIONS

ARCNET Local Area Network Standard ATA/ANSI 878.1, Version 1.9, ARCNET Trade Association, 1992.

High Performance Serial Bus, P1394/Draft 6.2v0, IEEE, Jun. 1, 1993.

Primary Examiner—Glenn A. Auve
Attorney, Agent, or Firm—Blakely, Sokoloff, Taylor & Zafman

[57] ABSTRACT

Circuitry and complementary logic are provided to a bus controller, a number of 1:n bus signal distributors, and a number of bus interfaces of an hierarchical bus assembly for conducting data communication transactions between bus agents interconnected to the hierarchical bus assembly. The hierarchical serial bus assembly is used to serially interface a number of isochronous and asynchronous peripherals to the system unit of a computer system. These circuitry and complementary logic of the serial bus elements implement a number of elemental packets and a number of transaction protocols, employing a master/slave model of transaction flow control. Data communication transactions are conducted using the elemental packets and in accordance to the transaction protocols. In some embodiments, these circuitry and complementary logic of the serial bus elements are also used to conduct connection management transactions between the serial bus elements. The connection management transactions are conducted in like manner as the data communication transactions.

12 Claims, 28 Drawing Sheets

Packet Format: Geographical Addressing
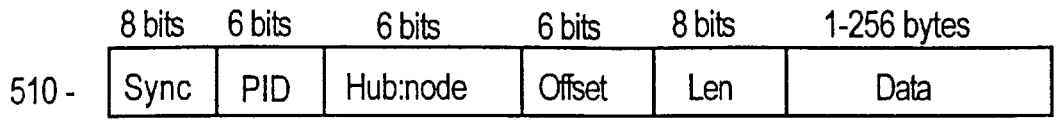
Data Packet
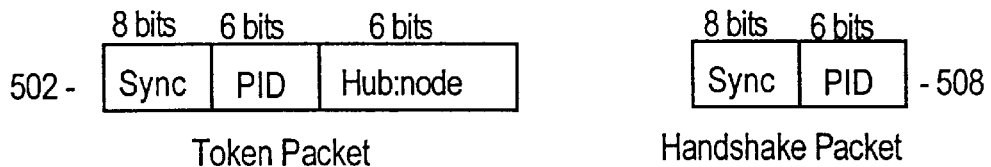
*Figure 14a*
Packet Format: Logical Addressing
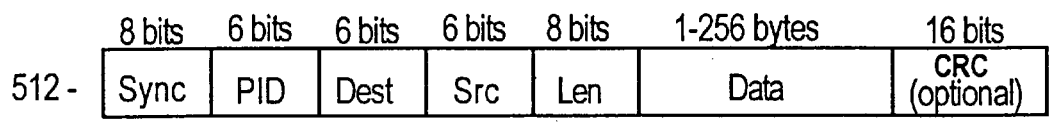
Data Packet
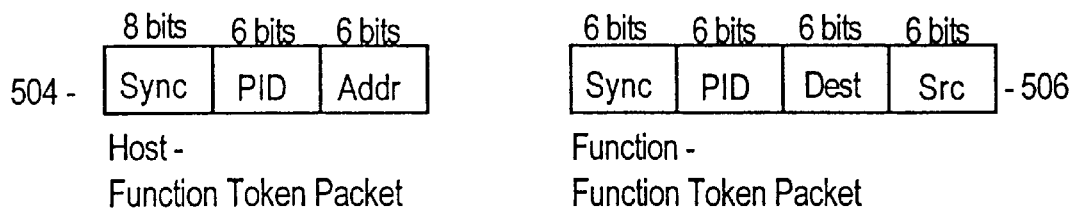
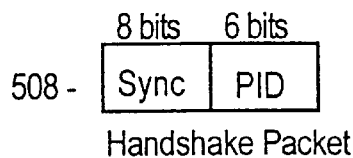
*Figure 14b*

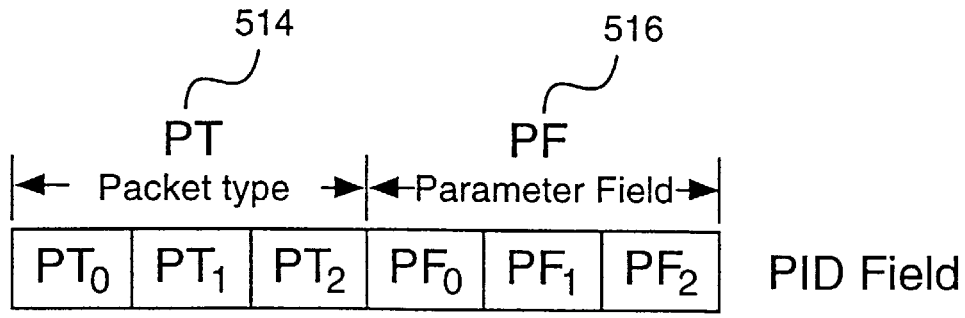

| PT <0:2> | Abbrev | Packet Type |
|---|---|---|
| 000 | LOGD | Logical data packet |
| 100 | GEOD | Geographical data packet |
| 101 | TKFF | Token between logical functions |
| 110 | TKHF | Logical token between host and function |
| 010 | GEOT | Geographical token packet |
| 001 | HSHK | Handshake packet |
| 011 | CTRL | Special control packet |
| 111 | RSVD | Reserved |

*Figure 15*

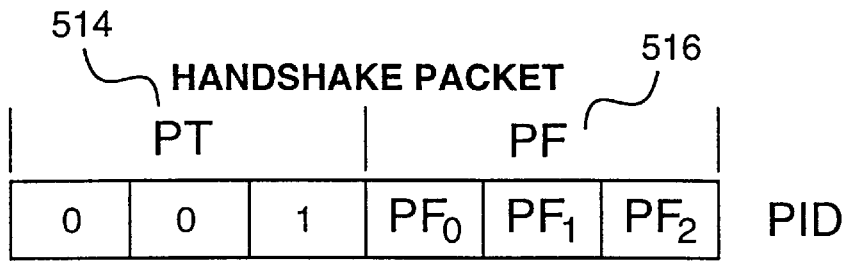

PF<0:2> = 0   Receive buffer cannot accept data (RCVNACK)
PF<0:2> = 1   Receive buffer can accept data (RCVACK)
PF<0:2> = 2   CRC check fails (CRCNACK)
PF<0:2> = 3   CRC check passes (CRCACK)
PF<0:2> = 4   Source cannot send data (NULL)
PF<0:2> = 5   Attention Request (ATTN)
PF<0:2> = 6   Logical function not finished reset
PF<0:2> = 7   Logical function completed reset

*Figure 16a*

Control Token Packet: Geographical Addressing

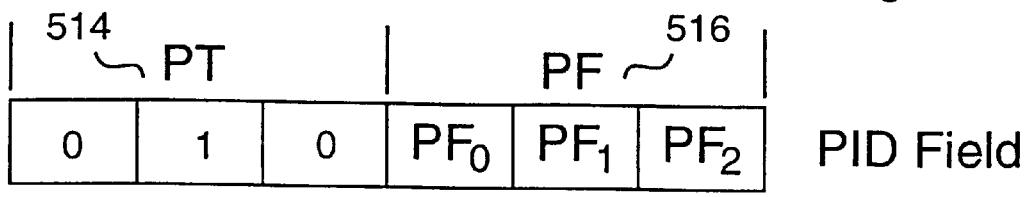

| Value | Abbrev | Function |
|---|---|---|
| PF = 000 | GRST | Global reset |
| PF = 001 | GNRS | Global node reset |
| PF = 010 | SNRS | Single node reset |
| PF = 011 | HSGP | Host sending GEO data packet |
| PF = 100 | PENB | Enable port N |
| PF = 101 | PDIS | Disable port N |
| PF = 110 | PENQ | Presence query |
| PF = 111 | GCVF | Geographical Configuration Verify |

*Figure 16b*

Control Token Packet: Logical Addressing

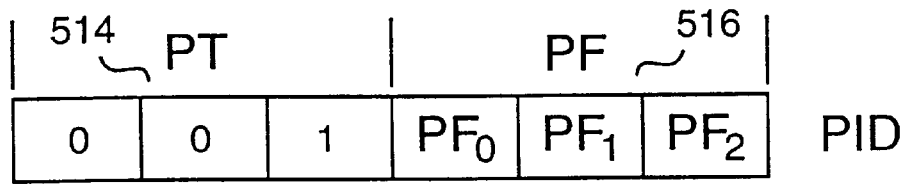

| | |
|---|---|
| PF<0:2> = 0 | Global function reset |
| PF<0:2> = 1 | Single function reset |
| PF<0:2> = 2 | Function Status request |
| PF<0:2> = 3 | Attention request |
| PF<0:2> = 4 | Reserved |
| PF<0:2> = 5 | Reserved |
| PF<0:2> = 6 | Reserved |
| PF<0:2> = 7 | Reserved |

*Figure 16c*

Function To FunctionToken Packet: Logical Addressing

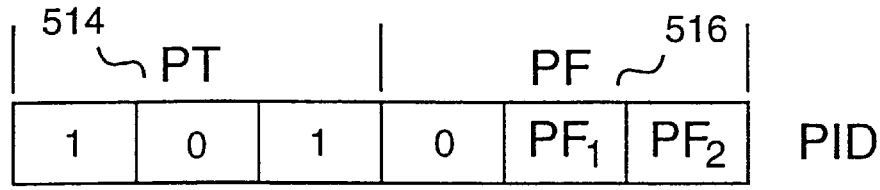

PF<0> = 0
PF<1:2> = 0    Asynchronous control packet
PF<1:2> = 1    Asynchronous/Isochronous block data packet
PF<1:2> = 2    Reserved
PF<1:2> = 3    Isochronous data packet

*Figure 17a*

Host To Function Token Packet: Logical Addressing

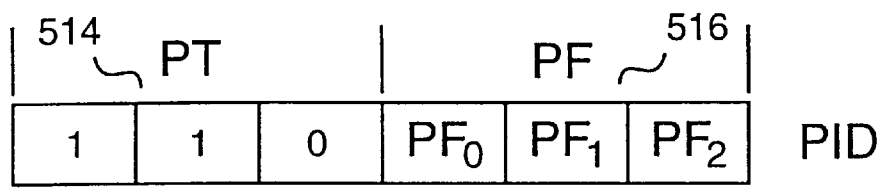

PF<0> = 0    Host sources packet
PF<0> = 1    Function sources packet
PF<1:2> = 0    Asynchronous control packet
PF<1:2> = 1    Asynchronous data/Isochronous block packet
PF<1:2> = 2    Reserved
PF<1:2> = 3    Isochronous data packet

*Figure 17b*

Data Packet: Geographical Addressing

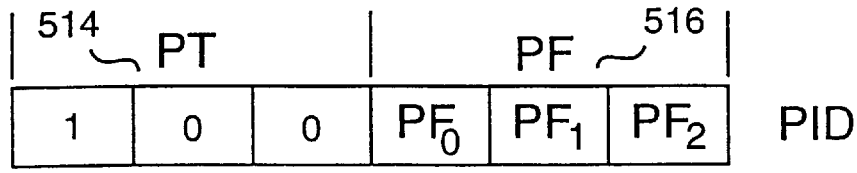

| PF<0:2> = 0 | Assign Logical Address |
| PF<0:2> = 1 | Assign geographical address |
| PF<0:2> = 2 | Geographical data packet |
| PF<0:2> = 3 | Reserved |
| PF<0:2> = 4 | Reserved |
| PF<0:2> = 5 | Reserved |
| PF<0:2> = 6 | Reserved |
| PF<0:2> = 7 | Reserved |

*Figure 17c*

Data Packet: Logical Addressing

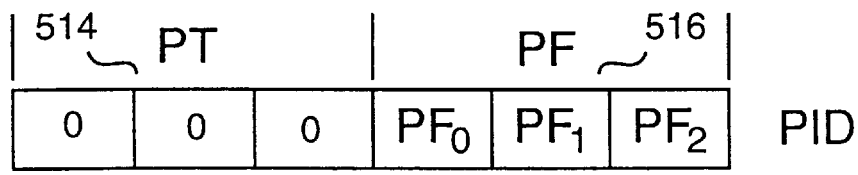

| PF<0> = 0 | Do not perform CRC generate/check |
| PF<0> = 1 | Perform CRC generate/check |
| PF<1:2> = 0 | Asynchronous control packet |
| PF<1:2> = 1 | Asynchronous data/Isochronous block packet |
| PF<1:2> = 2 | Reserved |
| PF<1:2> = 3 | Isochronous data packet |

*Figure 17d*

Host Sends Data, Function Accepts Data, No CRC Checking
(Logical Addressing)

Host Sends Data, Function Accepts Data, CRC Checking
(Logical Addressing)

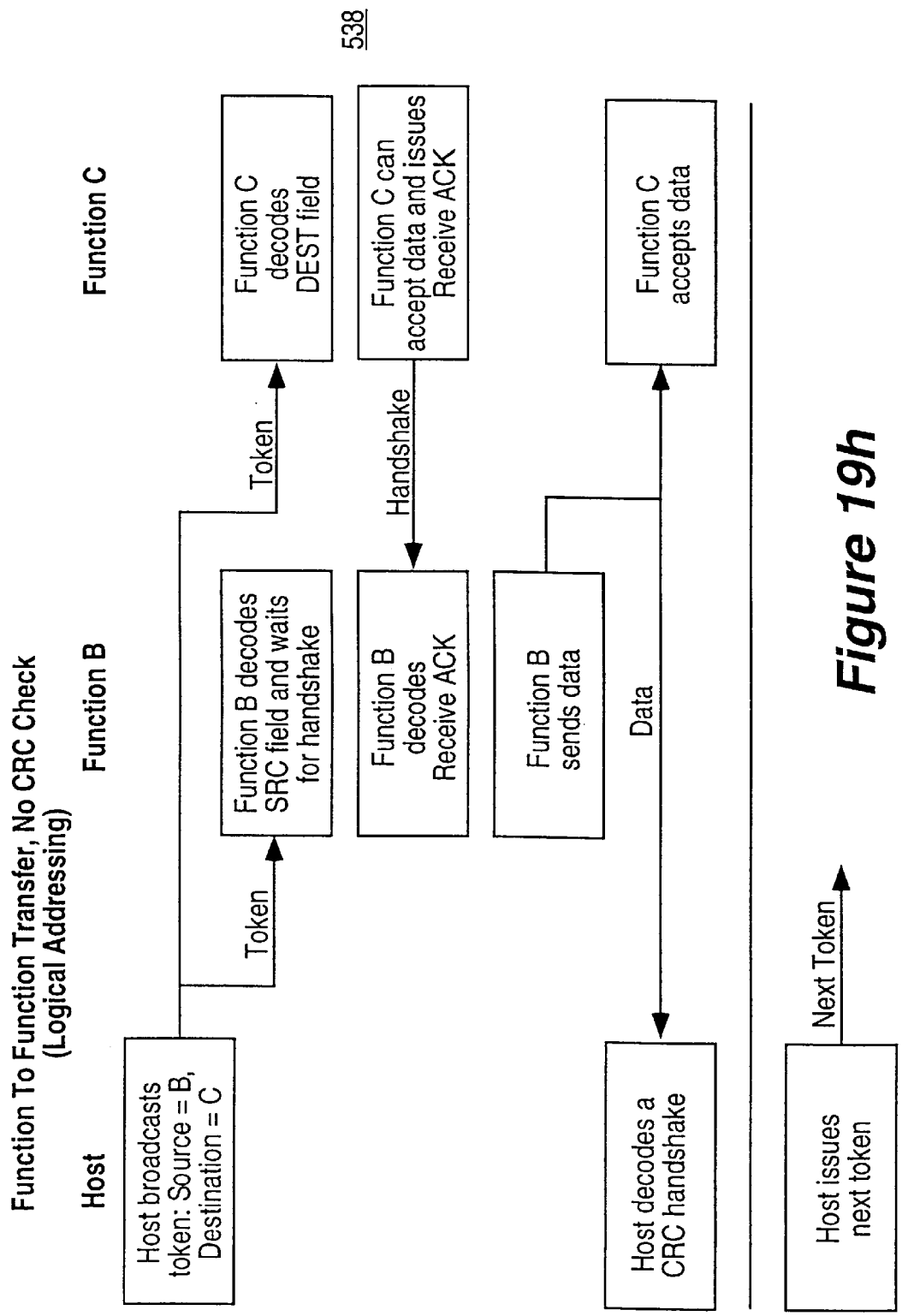

M&A FOR EXCHANGING DATE, STATUS AND COMMANDS OVER AN HIERARCHICAL SERIAL BUS ASSEMBLY USING COMMUNICATION PACKETS

This is a continuation application of application Ser. No. 08/619,863, filed Mar. 19, 1996, now issued as U.S. Pat. No. 5,694,555, which is a continuation of application Ser. No. 08/332,573, filed Oct. 13, 1994, now abandoned.

BACKGROUND OF THE INVENTION

1. Field of the Invention

The present invention relates to the field of computer systems. More specifically, the present invention relates to serial buses for connecting peripherals to the system units of computer systems, including the associated controllers and interfaces.

2. Background Information

A number of interrelated considerations is making it desirable to have a single, relatively fast, bi-directional, isochronous, low-cost, and dynamically configurable serial bus for simultaneously connecting isochronous as well as asynchronous peripherals to the system unit of a desktop computer system. Isochronous peripherals are peripherals that generate real time natural data such as voice, motion video, and the like. These interrelated considerations include:

Connection of the Telephone to the Desktop Computer

It is expected that the merging of computing and communication will be the basis of the next generation of productivity applications on desktop computers. The movement of machine oriented and human oriented data types from one location or environment to another depends on ubiquitous and cheap connectivity. Unfortunately, the computing and communication industries have evolved independently. As a result, a wide range of desktop computer and telephone interconnects have to be supported.

Ease of Use

The lack of flexibility in reconfiguring desktop computers has been acknowledged as its Achilles heel to it's further development The combination of user friendly graphical interfaces and the hardware and software mechanisms associated with the new generation of system bus architectures have made desktop computers less confrontational and easier to reconfigure. However, from the enduser point of view, the desktop computer's I/O interfaces such as serial/parallel ports, keyboard/mouse/joystick interfaces, still lack the attributes of plug and play or too limiting in terms of the type of I/O devices that can be live attached/detached.

Port Expansion

The addition of external peripherals to desktop computers continues to be constrained by port availability. The lack of a bidirectional, low-cost, low to mid speed peripheral bus has held back the proliferation of peripherals like telephone/fax/modem adapters, answering-machines, scanners, personal digital assistants (PDA), keyboards, mouses, etc. Existing interconnects are optimized for one or two point products. As each new function or capability is added to the desktop computer, typically a new interface has been defined to address this need.

In other words, this desired serial bus is expected to provide low cost simultaneous connectivity for the relatively low speed 10–100 kbps interactive devices such as keyboard, mouse, stylus, game peripherals, virtual reality peripherals, and monitors, as well as the moderate speed 500–5000 kbps isochronous devices such as ISDN, PBX, POTS, and other audio devices. A multiplicity of both types of devices are expected to be connected and active at the same time, and yet the latter type of devices are provided with guaranteed latencies and bandwidths. Furthermore, the devices are expected to be hot attached and detached, with the serial interface being able to dynamically reconfigure itself without interrupting operation of the desktop computer system.

There are several technologies that are commonly considered to be serial buses for connecting peripherals to system units of computer systems. Each of these buses is designed to handle a specific range of communications between system units and peripherals. Particular examples of these buses include:

Apple® Desktop Bus (ADB): ADB is a proprietary bus of Apple Computer Inc. It is a minimalist serial bus that provides a simple read/write protocol to up to 16 devices. Only basic functions are required of the controller and interface hardware. Thus, the implementation cost is expected to be low. However, ADB supports data rates only up to 90 kbps, just enough to communicate with asynchronous desktop devices such as keyboards and mouses. It is not capable of simultaneously supporting the moderate speed isochronous devices discussed earlier.

Access.bus (A.b): A.b is developed by the Access.bus Industry Group. It is based on the $I^2C$ technology of Philips Corporation and a software model of Digital Equipment Corporation (DEC). A.b is also designed primarily for asynchronous devices such as keyboards and mouses. However A.b is generally considered to be more versatile than ADB. A.b's protocol has well defined specifications for dynamic attach, arbitration, data packets, configuration and software interface. Moderate amount of functions are required of the controller and interface hardware. Thus, the implementation cost is only marginally competitive for the desired desktop application. While addressing is provided for up to 127 devices, the practical loading is limited by cable lengths and power distribution considerations. Revision 2.2 specifies the bus for 100 kbps operation, but the technology has headroom to go up to 400 kbps using the same separate clock and data wires. However, at 400 kbps, A.b still falls short in meeting the requirements of the moderate speed isochronous devices.

IEEE's P1394 Serial Bus Specification (aka FireWire): FireWire is a high performance serial bus. It is designed primarily for hard disk and video peripherals, which may require bus bandwidth in excess of 100 Mbps. It's protocol supports both isochronous and asynchronous transfers over the same set of 4 signal wires, broken up as differential pairs of clock and data signals. Thus, it is capable of simultaneously meeting the requirements of low speed interactive as well as moderate speed isochronous devices. However, elaborate functions are required of the controller and interface hardware, rendering FireWire to be non-price competitive for the desired desktop application. Moreover, the first generation of devices, based on FireWire's specification, are only just becoming available in the market.

The Concentration Highway Interface (CHI): CHI is developed by American Telephone & Telegraph Corporation (AT&T) for terminals and digital switches. It is a full duplex time division multiplexed serial interface for digitized voice transfer in a communication system. The protocol consists of a number of fixed time slots that can carry voice data and control information. The current specification supports data transfer rates up to 4,096 Mbps. The CHI bus has 4 signal wires: Clock, Framing, Receive Data, and Transmit Data. Both, the Framing and the Clock signals are generated centrally (i.e. PBX switch). Thus, it is also capable of simultaneously meeting the requirements of low speed interactive as well as the moderate speed isochronous devices. Similar to FireWire, elaborate functions are also required of the controller and interface hardware. As a result, CHI is also non-price competitive for the desired desktop application.

As will be disclosed in more detail below, the present invention provides the desired serial bus assembly, including its associated controller, bridging connectors and interfaces, that advantageously overcomes the limitations of the prior art serial buses in a novel manner.

SUMMARY OF THE INVENTION

The present invention includes circuitry and complementary logic provided to a bus controller, a number of 1:n bus signal distributors, and a number of bus interfaces of an hierarchical bus assembly for conducting data communication transactions between bus agents interconnected to the hierarchical bus assembly. The hierarchical serial bus assembly is used to serially interface a number of isochronous and asynchronous peripherals to the system unit of a computer system. These circuitry and complementary logic of the serial bus elements implement a number of elemental packets and a number of transaction protocols, employing a master/slave model of transaction flow control. Data communication transactions are conducted using the elemental packets and in accordance to the transaction protocols. In some embodiments, these circuitry and complementary logic of the serial bus elements are also used to conduct connection management transactions between the serial bus elements. The connection management transactions are conducted in like manner as the data communication transactions.

Typically, the bus controller is disposed in the system unit, and interconnected to a number of 1:n bus signal distributors and a number of bus interfaces. The bus interfaces are disposed in the connecting peripherals, one bus interface per connecting peripheral. The peripherals, through their bus interfaces, are generally connected to the system unit, through the bus controller, using one or more of the bus signal distributors. A bus interface is always a termination point. Only a bus signal distributor may have one or more bus signal distributor(s) and/or bus interface(s) connected upstream to it. Together, the system unit, the serial bus elements, and the peripherals form an hierarchy of interconnected devices.

A connecting peripheral may be an isochronous or an asynchronous peripheral. Typically, the isochronous peripherals operate with data rates in the range of 500–5000 kbps, whereas the asynchronous peripherals operate with data rates in the range of 10–100 kbps. Furthermore, a connecting peripheral may be a multi-function peripheral, i.e. multiple functions being mapped to a single bus connection point serviced by a single bus interface.

The elemental packets include a token packet, a handshake packet, and a data packet. Each packet includes a packet identifier identifying the packet type and nature of the packet. Preferably, each packet further includes a leading sync field to aid the interconnected devices in receiving the packet. The transaction protocols include protocols for transactions between the system unit and any one of the functions of the interconnected peripherals, between any two functions of the interconnected peripherals, and between the system unit and any one of the interconnected devices. The elemental packets and transaction protocols are adaptable for data communication as well as connection management transactions employing the master/slave model of flow control.

In embodiments where the various devices are physically interconnected together using low cost two signal wire cables, and electrical signals are propagated between the interconnected devices over the two signal wires in a differential manner, preferably the beginning and the end of a packet is denoted by the "fault" condition of zero difference. In embodiments where the interconnected devices jointly implement geographical addressing for the devices and logical addressing for the functions of the interconnected peripherals, the elemental packets and the transaction protocols further support transactions conducted in either the geographical address space or the logical address space.

BRIEF DESCRIPTION OF DRAWINGS

The present invention will be described by way of exemplary embodiments, but not limitations, illustrated in the accompanying drawings in which like references denote similar elements, and in which:

FIGS. 14a–14b illustrate one embodiment of the elemental packets of the present invention;

FIG. 15 illustrates one embodiment of the packet identifiers of the elemental packets including the packet types they identify;

FIGS. 16a–16c and 17a–17d illustrate one embodiment of the packet fields of the packet identifiers and their corresponding meanings;

FIGS. 19a–19k illustrate one embodiment of data communication transaction protocols;

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
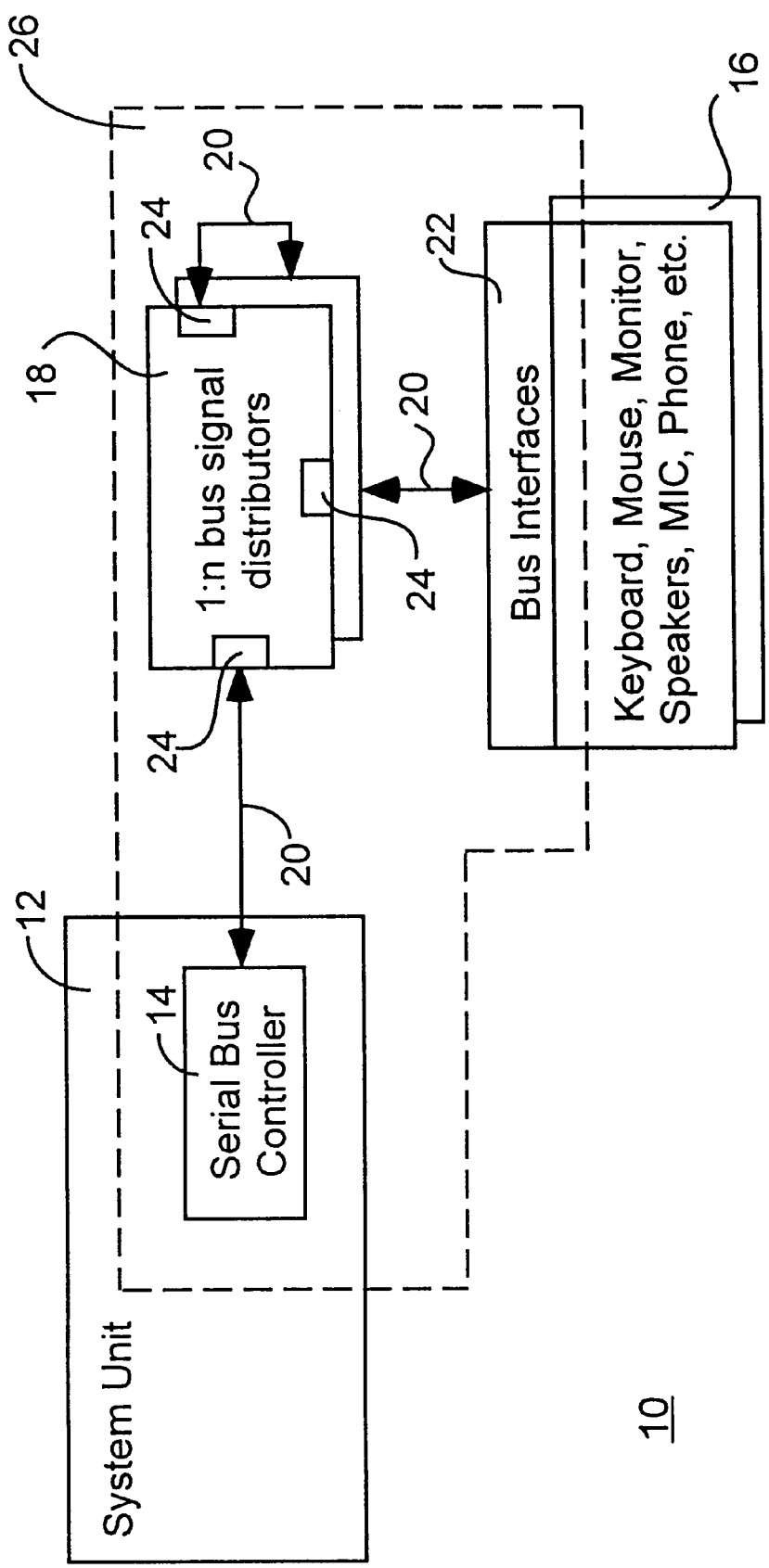
FIG. 1 illustrates an exemplary computer system incorporating the serial bus teachings of the present invention.

Hierarchical Serial Bus Assembly for Serially Interfacing Isochronous and Asynchronous Peripherals to a System Unit of a Computer System Referring now to FIG. 1, a block diagram illustrating an exemplary computer system incorporating the serial bus teachings of the present invention is shown. Exemplary computer system 10 comprises system unit 12 having serial bus controller 14 of the present invention, 1:n bus signal distributors 18 of the present invention, each having n+1 ports 24, and peripherals 16 having bus interfaces 22 of the present invention. Peripherals 16 are coupled to bus controller 14 of system unit 12 through 1:n bus signal distributors 18 and preferably cables 20. Collectively, bus controller 14, bus signal distributors 18, bus interfaces 22, and cables 20 form a serial bus assembly 26 interconnecting bus agents, i.e. system unit 12 and peripherals 16 to each other.

Figure 7:
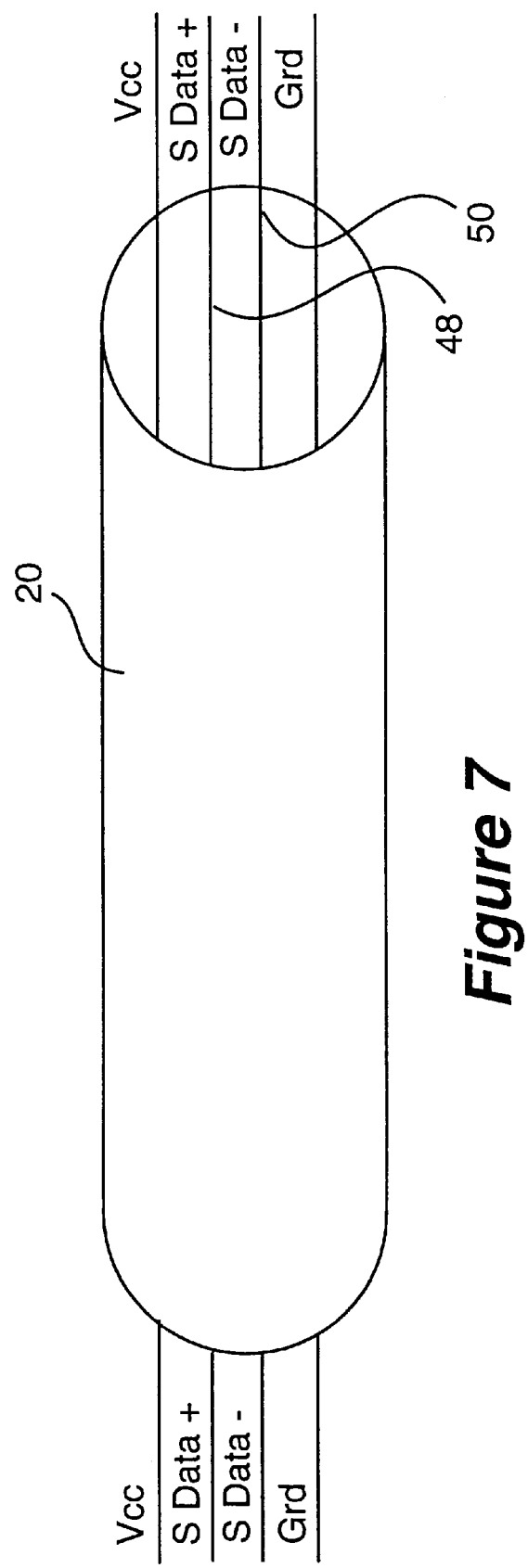
FIG. 7 illustrates one embodiment of the cables physically connecting the serial bus elements under the present invention.

Cables 20 are preferably low cost two signal wires cables 48 and 50 (as illustrated in FIG. 7). However, cable 20 are capable of supporting data transfer rates up to 5 Mbps. Furthermore, when such low cost cables 20 are employed, electrical signals are preferably propagated over the two signal wires 48 and 50 between the interconnected devices 14,18 and 22 in a differential manner. For examples, a negative voltage differential represents a 1-bit and a positive voltage differential represents a 0-bit. Electrical signals are preferably also used to signal a number of information. For further description of electrical signaling, see U.S. patent application Ser. No. 08/332,337, entitled Method And Apparatus For Serial Bus Elements Of An Hierarchical Serial Bus To Electrically Represent Data And Control States To Each Other, which is hereby fully incorporated by reference.

Except for bus controller 14, system unit 12 is intended to represent a broad category of system units of computer systems whose constitutions and functions are well known, and will not be otherwise further described. Similarly, except for bus interfaces 22, peripherals 16 are intended to represent a broad category of desktop peripherals, such as keyboards, mouses, monitors, speakers, microphone, telephones, whose constitutions and functions are also well known, and will not be otherwise further described either. Bus controller 14, bus signal distributors 18 and bus interfaces 22 will be described in more detail below with additional references to the remaining figures.

Figure 2:
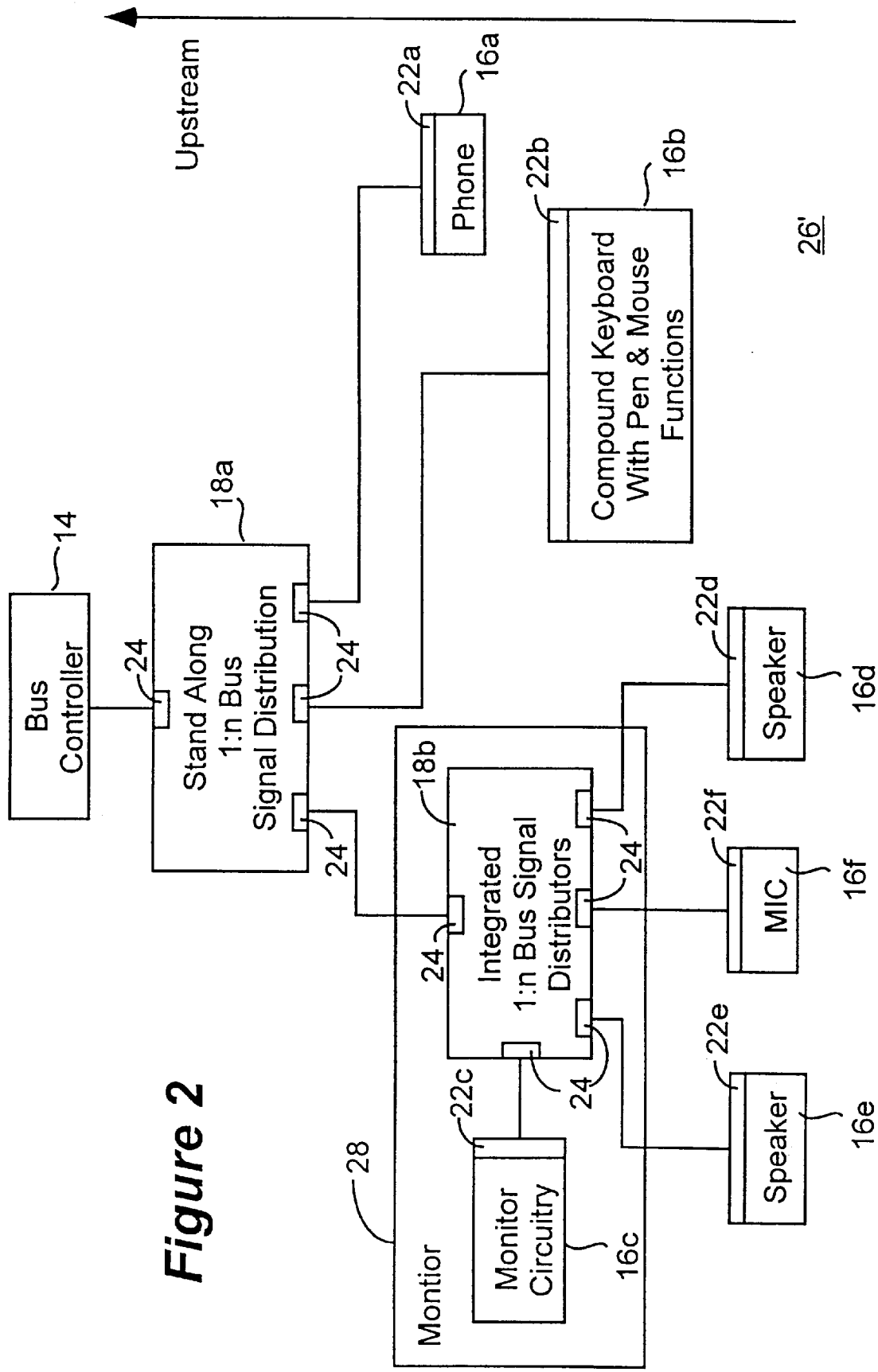
FIG. 2 illustrates one embodiment of the serial bus assembly of FIG. 1 in further detail.

FIG. 2 illustrates one embodiment of the serial bus assembly of FIG. 1 in further detail. For this embodiment, serial bus assembly 26' includes serial bus controller 14, standalone 1:n bus signal distributor 18a, integrated 1:n bus signal distributor 18b, and bus interfaces 22a–22f. The serial bus assembly 26' interconnects bus agents telephone 16a, compound keyboard 16b including keyboard, pen and mouse functions, monitor circuitry 16c of monitor 28, speakers 16d–16e and microphone 16f to system unit 12. Together, the system unit 12, the serial bus elements 14, 18a–18b and 22a–22f, and the interconnected peripherals 16a–16f form an hierarchy of interconnected devices.

Under the present invention, a bus interface 22a–22f is always a termination point. Only a bus signal distributor, e.g. 18a, may have one or more bus signal distributors, e.g. 18b, and/or one or more bus interfaces, e.g. 22a, coupled upstream to it. For the purpose of this disclosure, upstream means "towards the bus controller". Thus, except for the degenerate case where the serial bus assembly 26 has only one connecting peripheral 16, typically it is a bus signal distributor, such as 18a, that is connected upstream to the bus controller 14.

Furthermore, under the present invention, a connecting peripheral may be an isochronous peripheral, such as telephone 16a, speakers 16d–16e, and microphone 16f, or asynchronous peripherals, such as compound keyboard 16b and monitor 16c. The isochronous peripherals may operate with a data transfer rate as high as 5 Mbps, while the asynchronous peripherals may operate with a data transfer rate as high as 100 kbps. Furthermore, a connecting peripheral 16a–16f may be a multiple function peripheral, i.e. multiple functions mapping to a single bus connection point serviced by a bus interface, e.g. 22b. Similarly, although not shown, the system unit 12 may support multiple clients.

Figure 3:
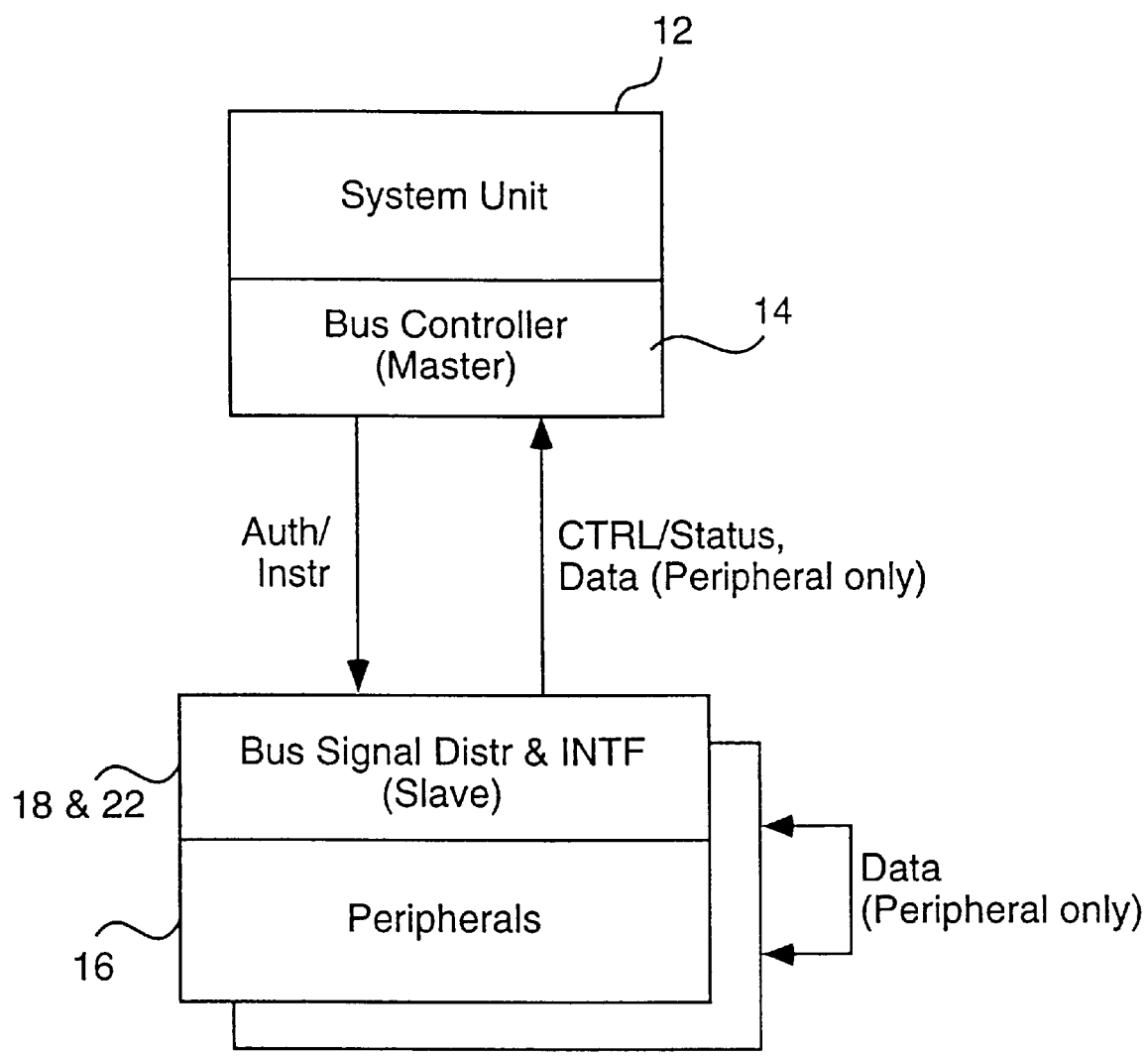
FIG. 3 illustrates a master/slave model of flow control employed by the present invention for serially interfacing the interconnected peripherals to the system unit and controlling transaction flows.

FIG. 3 illustrates a master/slave model of flow control employed by the present invention for serially interfacing the interconnected peripherals to the system unit and controlling transaction flow. As illustrated, the bus controller 14, the signal bus distributors 18, and the bus interfaces 22 cooperate to implement the master/slave model of flow control. The bus controller 14 serves as the master, and the signal bus distributors 18 as well as the bus interfaces 22 behave as slave devices to the bus controller 14.

Under the master/slave model, the bus controller 14 provides flow control for all data communication transactions between the bus agents at their respective operating speeds. The bus interfaces 22 engage in data communication transactions on behalf of the functions of the peripherals 16. However, the bus interfaces 22 accept or transmit data only if they have been authorized or instructed (aka "polled") to do so by the bus controller 14. The bus signal distributors 18 serve strictly as signal distributors. They are merely transparent conduits when data communication transactions are conducted by the bus controller 14 and the bus interfaces 22 on behalf of the bus agents. Thus, the bus signal distributors 18 never actively participate in data communication transactions, accept data or respond with data.

The bus controller 14 systematically polls the functions of the interconnected peripherals 16 through their bus interfaces 22 for data communication transactions in accordance to a polling schedule which guarantees latencies and bandwidths to the isochronous functions of the interconnected peripherals 16. Polling of the isochronous functions of the interconnected peripherals 16 for data communication transactions are prioritized over for all other polling and as frequent as they are necessary to meet the guaranty. Polling of the asynchronous functions of the interconnected peripherals 16 through their bus interfaces 22 for data communication transactions are scheduled around the polling of the isochronous functions of the interconnected peripherals 16 for data communication transactions. Preferably, the polling schedule is dynamically adapted to the interconnected peripherals 16 actually present.

In some embodiments, the bus controller 14, the bus signal distributors 18 and the bus interfaces 22 further engage in connection management transactions employing the same master/slave model for flow control. Similarly, the bus controller 14 provides flow control for conducting the connection management transactions at the serial bus elements' respective operating speeds. The bus signal distributors 18 and the bus interfaces 22 respond to the connection management transactions, replying with control/status information as appropriate. The bus controller 14, during operation, polls the bus signal distributors 18 and the bus interfaces 22 for such transactions. Polling of the bus signal distributors 18 and the bus interfaces 22 for connection management transactions are also scheduled around polling of the isochronous functions of the interconnected peripherals 16 for data communication transactions. Preferably, the expanded polling schedule is also dynamically adapted to the serial bus elements actually present.

Figure 4:
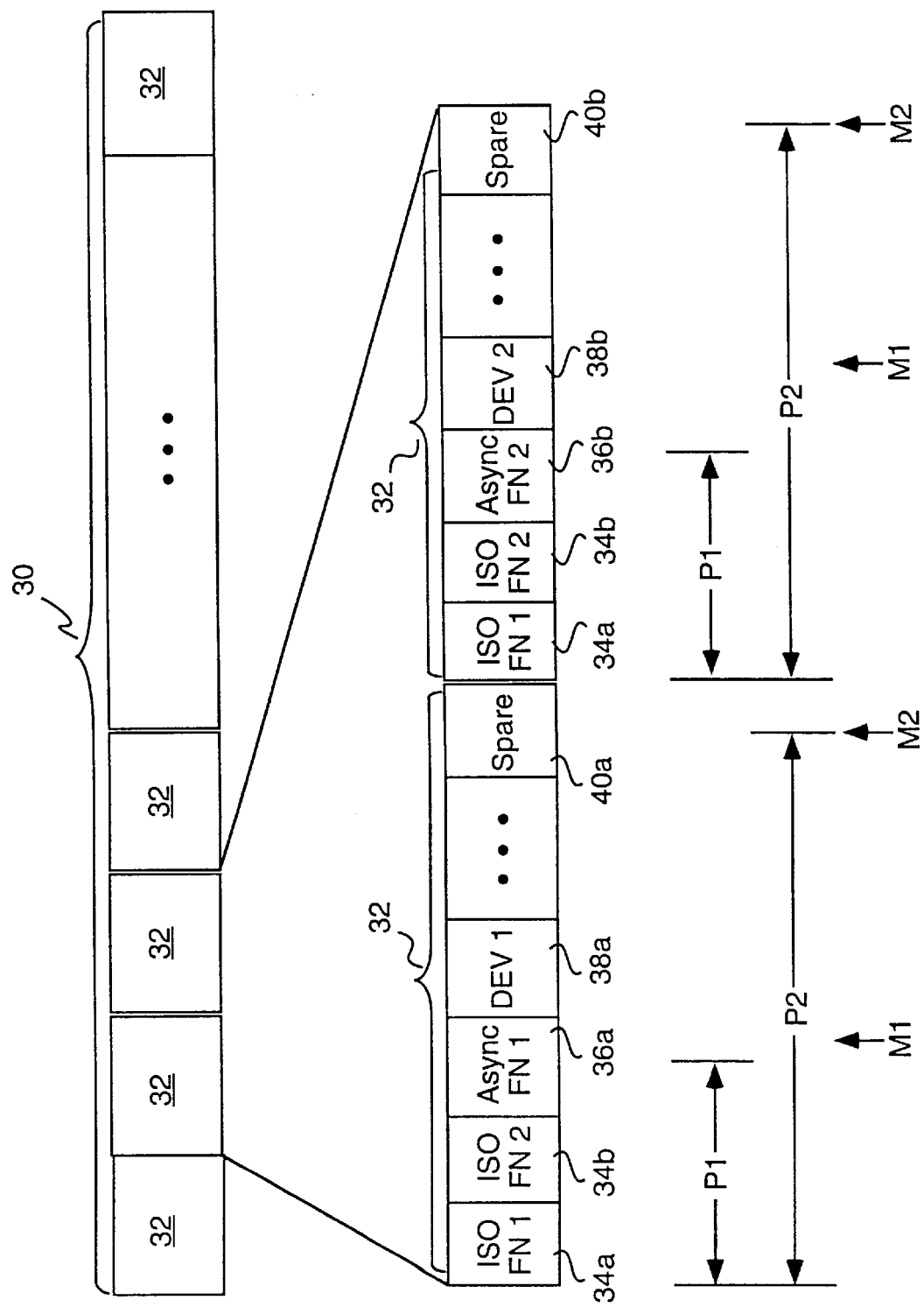
FIG. 4 illustrates a frame based polling schedule of the present invention implemented by some embodiments for polling the slave "devices"

FIG. 4 illustrate a frame based polling scheduling of the present invention implemented by some embodiments for conducting the various transactions employing the master/slave model of flow control. As illustrated, the polling schedule 30, also referred to a super frame, comprises of a number of sub-schedules 32, also referred to as soft frames. An isochronous function 34a or 34b of an interconnected peripheral 16 is polled as frequent as it is necessary in one or more soft frames 32 of the super frame 30 to guarantee its latency and bandwidth. However, an asynchronous function 36a or 36b is polled only once in one soft frame 32 of the super frame 30 for data communication transaction. Similarly, an interconnected device 38a or 38b is also polled only once in one soft frame 32 of the super frame 30 for connection management transaction.

Preferably, all isochronous functions 34a–34b are polled within a first percentage portion (P1) of a soft frame 32 to ensure the latency and bandwidth guaranties are met. Isochronous functions that cannot be accommodated within P1 are preferably rejected for insufficient capacity. The upper delimiter (M1) of P1 is also referred to as the isochronous watermark. Similarly, all polling are preferably performed within a second percentage portion (P2) of a soft frame 32 to ensure reliability of operation. Multiple soft frames 32 are employed if necessary to accommodate all asynchronous function and serial bus element polling. The upper delimiter (M2) of P2 is also referred to as the frame watermark.

Various manners in which such frame based polling schedule may be dynamically generated and updated, are described in the copending application Ser. No. 08/331,727, entitled Method And Apparatus For Dynamically Generating And Maintaining Frame Based Polling Schedules That Guaranty Latencies And Bandwidths To Isochronous Functions, which is hereby fully incorporated by reference.

Figure 5:
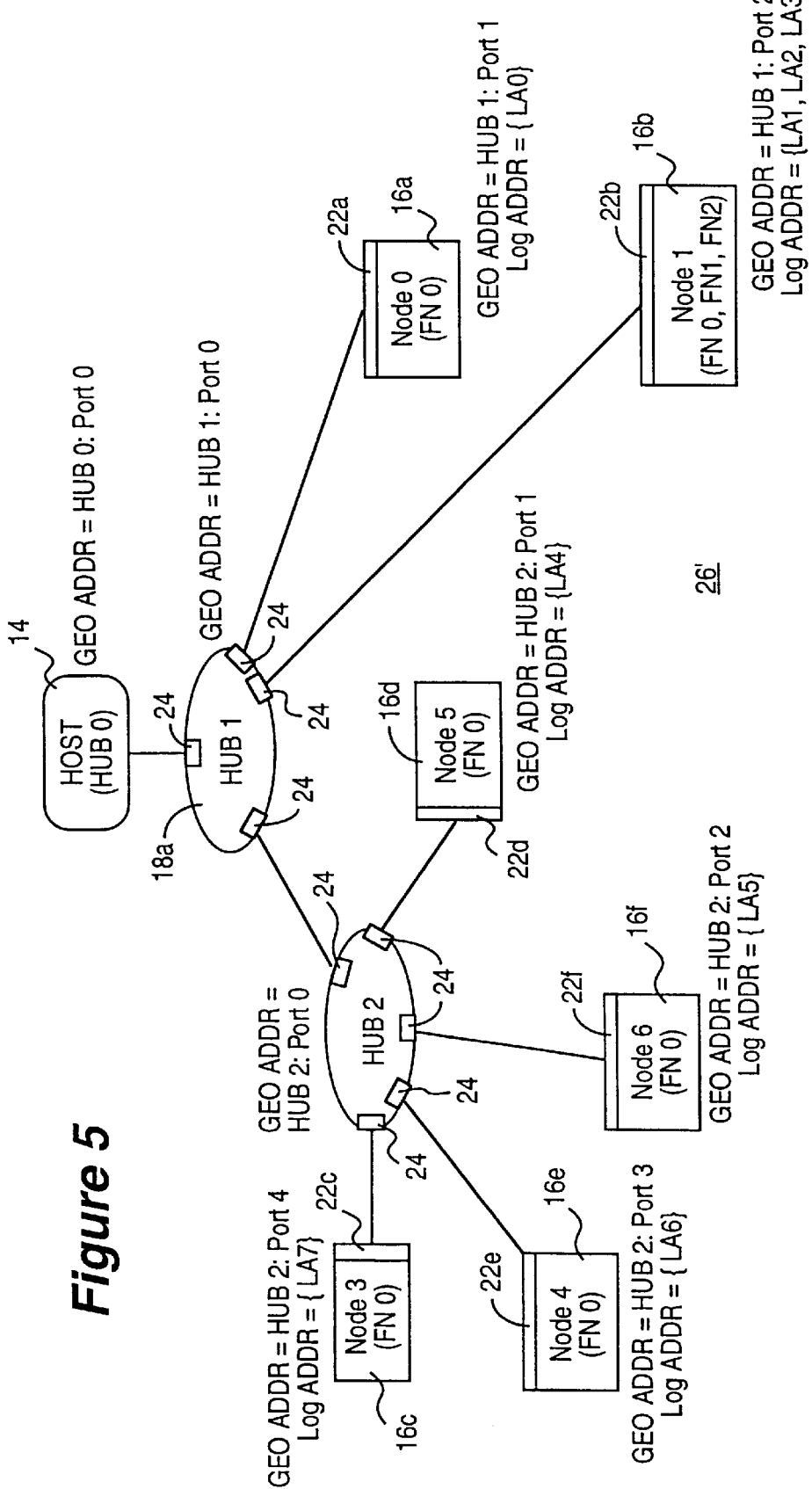
FIG. 5 illustrates geographical and logical addressing of the present invention implemented by some embodiments for addressing serial bus elements and functions of bus agents.

FIG. 5 illustrates geographical and logical addressing of the present invention implemented by some embodiments for addressing the serial bus elements and functions of bus agents. For ease of explanation, the same exemplary serial bus assembly of FIG. 2 is used. However, the bus controller 14 is labeled as Host, also referred to as Hub0. The bus signal distributors 18a–18b are labeled as Hub1 and Hub2. The peripherals 16a–16f including their corresponding bus interfaces 22a–22f are jointly labeled as Node0 through Node6. The functions of peripherals 16a–16f are labeled as FN0, FN1, etc.

As illustrated, the serial bus elements and functions of the bus agents are assigned geographical as well as logical addresses (GEO ADDR & LOG ADDR) of a geographical and a logical address space. More specifically, the Hubs 14, 18a–18b and the Nodes 22a–22f are assigned GEO ADDRes, whereas the functions of the Nodes 16a–16f are assigned LOG ADDRes. Preferably, the Hub identity as well as the upstream port of the Hub may be inferred from the GEO ADDR of a Hub 14, and 18a–18b, and the connecting Hub as well as the connecting port of the connecting Hub may be inferred from the GEO ADDR of a Node 22a–22f. In one embodiment, the LOG ADDRes are assigned to the functions of the Nodes 16a–16f in a chronological manner.

For examples, in the illustrated exemplary application, Hub1 and Hub2 18a and 18b are assigned the GEO ADDRes of "Hub1:Port0" and "Hub2:Port0" respectively, identifying the Hubs 18a and 18b as "Hub1" and "Hub2" respectively, and in each case, the upstream port being "Port0". Node1 and Node4 22b and 22e are assigned the GEO ADDRes of "Hub1:Port2" and "Hub2:Port3" respectively, identifying the connecting Hubs 18a and 18b as "Hub1" and "Hub2" respectively, and the connecting ports of connecting Hubs 18a and 18b as "Port2" and "Port3" respectively. The functions of Node1 16b are assigned the LOG ADDRes of "LA1", "LA2" and "LA3", whereas the function of Node4 16e is assigned the LOG ADDR of "LA6".

Preferably, the GEO ADDRes and the LOG ADDRes are dynamically assigned at power on or reset, and updated in response to live detachment of interconnected devices or attachment of additional devices, by the bus controller 14 in cooperation with the bus signal distributors 18 and the bus interfaces 22. A particular implementation of such dynamic connection management is described in the copending application Ser. No. 08/332,375, entitled Method And Apparatus For Dynamically Determining And Managing Connection Topology Of An Hierarchical Serial Bus Assembly, which is hereby fully incorporated by reference.

For these embodiments, the GEO ADDRes are used to conduct connection management transactions among the serial bus element, whereas the LOG ADDRes are used to conduct data communication transactions among the functions of the bus agents The separation of the two types of transactions into the two separate address spaces facilitate dynamic connection management of the serial bus elements, without having to interrupt services to the functions of the bus agents.

Figure 6:
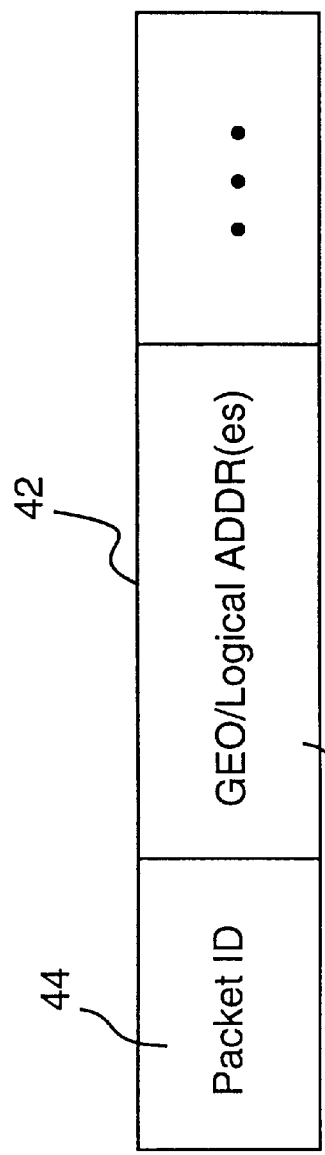
FIG. 6 illustrates the essential elements of communication packets of the present invention implemented by some embodiments for conducting transactions employing the master/slave model of flow control.

FIG. 6 illustrates the essential elements of communication packets of the present invention implemented by some embodiments for conducting the various transactions employing the master/slave model of flow control. For these embodiments, packet identifiers 44 are employed to differentiate control packets from data packets. Control packets are packets employed by the bus controller 14 to authorize or instruct the bus signal distributors 18 and the bus interfaces 22 to engage in transactions. Control packets may also include packets employed by the bus signal distributors 18 and the bus interfaces 22 to acknowledge authorizations or instructions from the bus controller 14. Furthermore, addresses 46 are employed as appropriate to identify the transaction parties. As will be appreciated that under the master/slave model of flow control, the bus controller 14 as a transaction participant may often be inferred, and therefore its address may be omitted.

Preferably, transaction flow, such as from bus controller 14 to a function, from a first function to a second function, may be inferred from the packet identifiers 44. Preferably, either geographical or logical addresses 46, i.e. "HubX-:PortY" or "LAz", may be specified to accommodate those embodiments that support connection management transactions and implement both types of addresses.

A particular implementation of employing such communication packets to conduct the various transactions will be described in more detail below.

Figure 8:
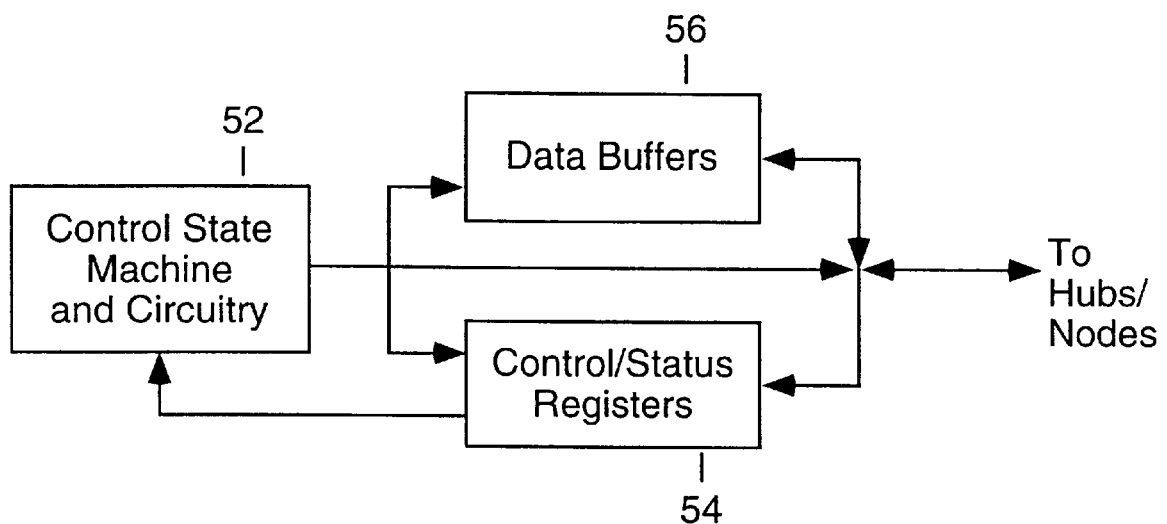
FIGS. 8–9 illustrate one embodiment of the bus controller of the present invention including its associated software.
Figure 9:
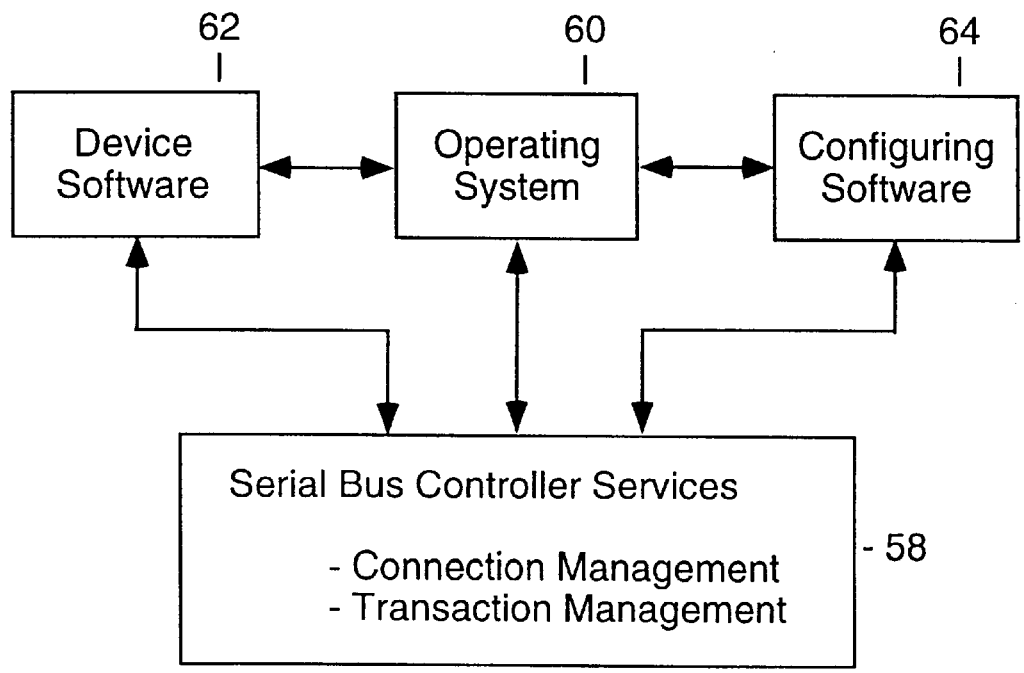

FIGS. 8–9 illustrate one embodiment of the bus controller of the present invention. In this embodiment, the bus controller 14 includes a control state machine and circuitry 52, control/status registers 54, data buffers 56, and bus controller software services 58. The control/status registers 54 are used to store the various control and status data. For examples, the serial bus elements present, their interconnection topology, the functions of the various interconnected peripherals, the geographical addresses assigned to the serial bus elements, the logical addresses assigned to the functions of the interconnected peripherals. The data buffers 56 are used to buffer the data of the data communication transactions between the bus agents. The control state machine and circuitry 52 operates the hardware, controlling data communication transactions and employing the above described master/slave model of flow control, under the programming of the bus controller software services 58. For some embodiments, the control state machine and circuitry 52 further operates the hardware, controlling connection management transactions, implementing the master/slave model of flow control with frame based polling schedule, employing geographical and logical addressing, supporting communication packet based transactions, and/or inference of data and control states from states of the propagation electrical signals. In particular, the control and state machine circuitry 52 causes the bus controller 14 to cooperate with the bus signal distributors 18 and the bus interfaces 22, and conduct the various transactions using the elemental packets and protocols of the present invention, which will be described in more detail below.

The bus controller software services 58 program the control state machine and circuitry 52 responsive to the operating system 60 and other software such as device and configuring software 62 and 64 of the system unit 12. In particular, the services include connection management such as detection of serial bus elements present, detection of their interconnection topology, detection of the functions of the interconnected peripherals, and assignment of the geographical and logical addresses. The services further include transaction management such as generation and maintenance of the polling schedule, polling of the serial bus elements and functions of the bus agents, acknowledgment of certain responses of the serial bus elements and functions of the bus agents, and exchange of data with functions of the bus agents.

For a more detailed descriptions of the bus controller hardware and the bus controller software services 58, refer to the incorporated by reference copending application Ser. Nos. 08/332,375, 08/331,727, and 08/332,337. It should be noted that the allocation of functions to the hardware and software services of the bus controller 14 is implementation dependent. The present invention may be practiced with any number of allocations, ranging from minimal hardware usage to minimal employment of software services.

Figure 10:
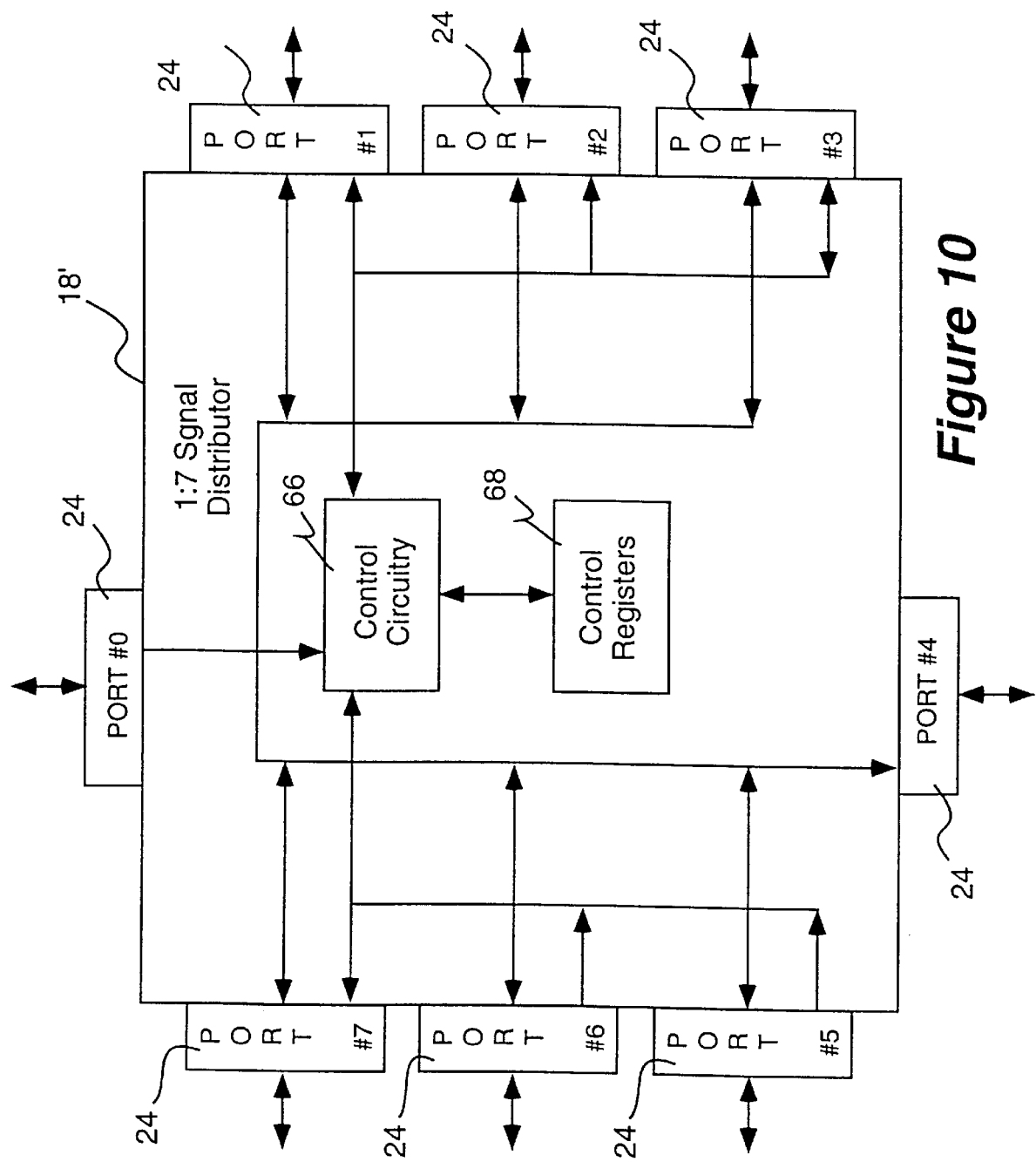
FIGS. 10–11 illustrate one embodiment of the 1:n bus signal distributor of the present invention including its port circuitry.
Figure 11:
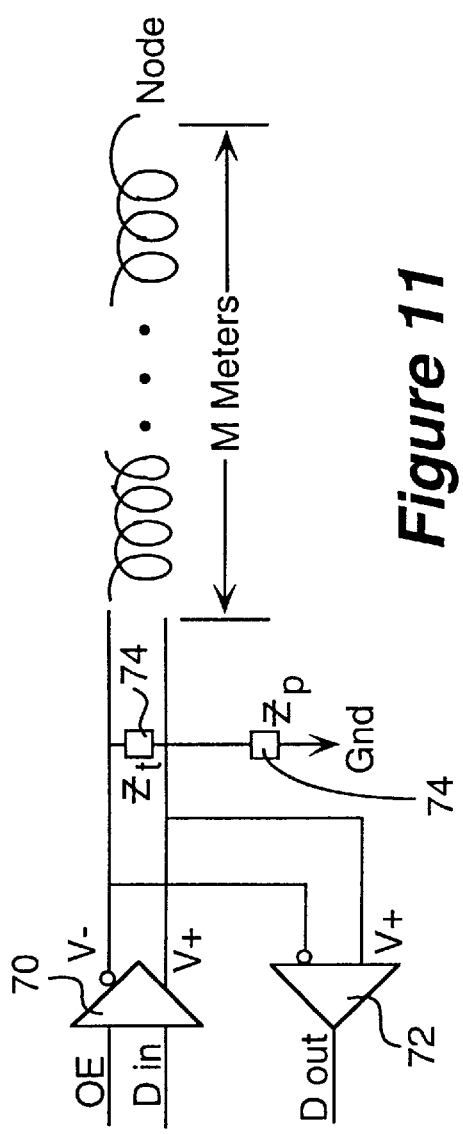

FIGS. 10–11 illustrate one embodiment of the bus signal distributor of the present invention. The illustrated embodiment is a 1:7 bus signal distributor 18' having control circuitry 66, control registers 68, and 8 ports 24. Port 0 24 is used to connect the bus signal distributor 18' upstream to the bus controller 14 or another bus signal distributor 18. Ports 1–7 are used to connect up to a total of 7 bus signal distributors 18 and/or bus interfaces 22 to itself. The control registers 68 are used to store its own control and status information such as whether a port 24 has a bus interface 22 connected to it or not, and whether the port 24 is turned ON/OFF. The control circuitry 66 operates the bus signal distributor 18' responsive to instructions from the bus controller 14. In particular, the control circuitry 66 causes the bus signal distributor 18 to cooperate with the bus controller 14, and conduct the various transactions using the elemental packets and protocols of the present invention, which will be described in more detail below.

In embodiments where the low cost two signal wire cables 20 are used to interconnect the serial bus elements, and electrical signals are preferably propagated in a differential manner, each port 24 comprises two differential amplifiers 70 and 72 for generating the differential signals. Preferably, each port 24 further having two resistors 74 coupled to ground as shown, pulling the signals on the two wires to ground, thereby allowing the absence or presence of a connected bus interface 22 to be discernible. The appropriate values of resistors 74 may be determined empirically depending on individual implementations.

For a more detailed descriptions of the control circuitry 64 and its cooperative relationship with the bus controller 14, refer to the incorporated by reference copending application Ser. No. 08/332,375.

Figure 13:
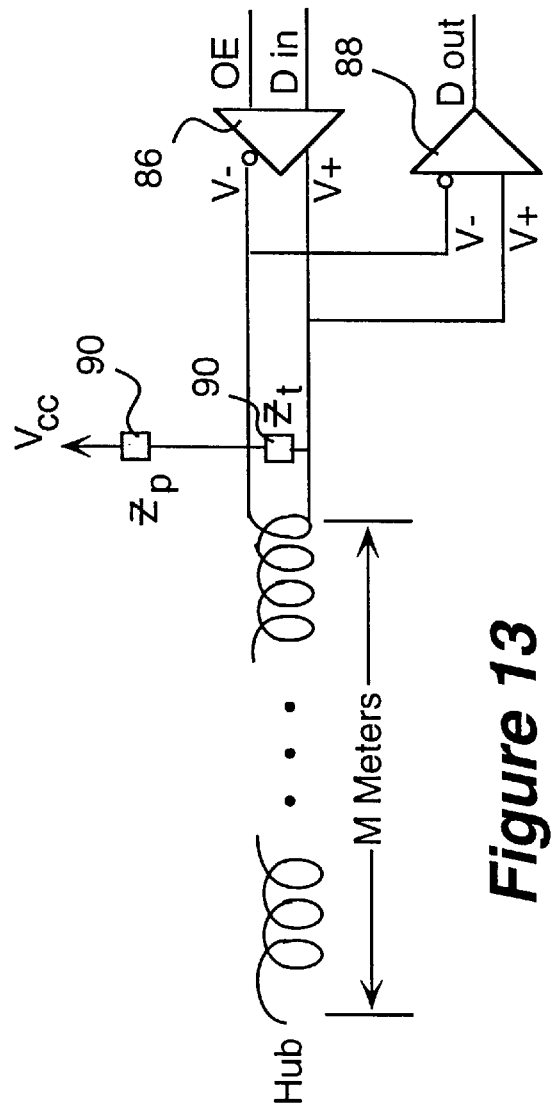
FIGS. 12–13 illustrate one embodiment of the bus interface of the present invention including its connector circuitry.
Figure 12:
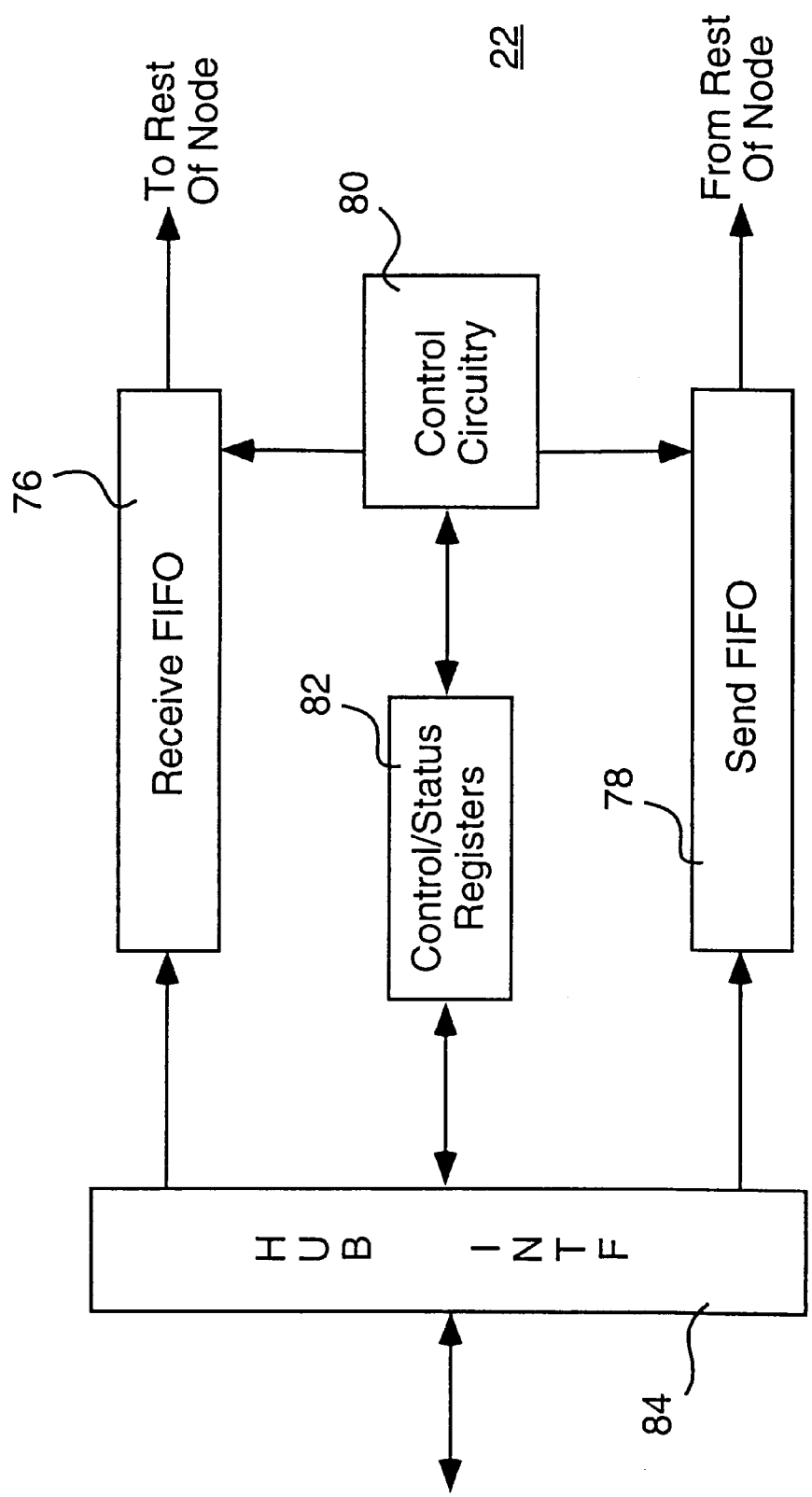

FIGS. 12–13 illustrate one embodiment of the bus interfaces of the present invention. For this embodiment, the bus interface 22 comprises control circuitry 80, control/status registers 82, a Hub interface 84 and two FIFOs 76–78, a Receive FIFO 76 and a Send FIFO 78. Receive and Send FIFOs 76–78 are used to stage the receive and send data for data communication transactions. The control/status registers 68 are used to store its own control and status information such as its assigned geographical address, functions of its "host" peripheral, and their assigned logical addresses. The control circuitry 66 operates the bus interface 22 on behalf of the "host" peripheral and the "host" peripheral's functions, responsive to authorizations and instructions from the bus controller 14. In particular, the control circuitry 80 causes the bus interface 22 to cooperate with the bus controller 14, and conduct the various transactions using the elemental packets and protocols of the present invention, which will be described in more detail below.

In embodiments where the low cost two signal wire cables 20 are used to interconnect the serial bus elements, and electrical signals are preferably propagated in a differential manner, the connector interface 84 comprises two differential amplifiers 86 and 88 for generating the differential signals. Preferably, the connector interface 84 further includes two resistors 90 coupled to Vcc as shown, pulling the signals on the two wires to Vcc complementary to the port circuitry of a connecting bus signal distributor 18. The appropriate values of resistors 90 may also be determined empirically depending on individual implementations.

For a more detailed description of the bus interface 22, refer to the incorporated by reference copending application Ser. Nos. 08/332,375, 08/331,727, and 08/332,337.

Data Communication Transactions and Connection Management Transactions

Having now described the hierarchical serial bus assembly 26 and the manner its element cooperate to serially interface the isochronous and asynchronous peripherals 16 to the system unit 12 of the exemplary computer system 10, the elemental packets and protocols employed under the present invention to conduct the various transactions will now be described in detail.

FIG. 14a–14b illustrate one embodiment of the elemental packets of the present invention. As shown, the elements packets include token packets 502–506, handshake packets 508 and data packets 510–512. For embodiments that support geographical addressing and logical addressing, different packet formats are provided for geographically addressed token packets 502 and logically addressed token packets 504–506. Furthermore, separate packet formats are provided for logically addressed host-function token packet 504 and logically addressed function-function token packet 506. Similarly, different packet formats are provided for geographically addressed data packets 510 and logically addressed data packets 512.

Each packet 502–512 includes a leading Sync field to facilitate receipt of the packet 502–512 by a serial bus element. Each packet 502–512 further includes a packet identifier field (PID) for identifying the packet type and the nature of the packet. Each token/data packet 502–506 or 510–512 further includes at least one geographic/logical address identifying the recipient serial bus element. A geographically addressed data packet 510 further includes an Offset field identifying a specific storage location of the recipient serial bus element, whereas a logically addressed data packet 512 further includes a Source field identifying the source serial bus element. Each data packet 510–512 further includes a data length field and the data themselves. Lastly, a logically addressed data packet 512 may further include a CRC check field.

FIG. 15 illustrates one embodiment of the packet identifiers of the elemental packets including the packet types they identify. For the illustrated embodiment, each packet identifier (PID) includes a packet type field (PT) and a parameter field (PF). In one embodiment, PT is 3 bits wide, identifying exemplary packet types, such as logical data packet (LOGD), geographical data packet (GEOD). FIGS. 16a–16c and 17a–17d illustrate one embodiment of the packet fields of the packet identifiers and their corresponding meanings. In one embodiment, PF is also 3 bits wide, identifying exemplary meanings, such as receive buffer cannot accept data (RCVNACK) for a handshake packet, enable port N (PENB) for a geographically addressed token packet, global function reset for a logically addressed token packet, isochronous block data packet for a logically addressed function to function token packet; host source packet for a geographically addressed host to function token packet, assign geographical address for a geographically addressed data packet, and perform CRC check for a logically addressed data packet.

Figure 18A:
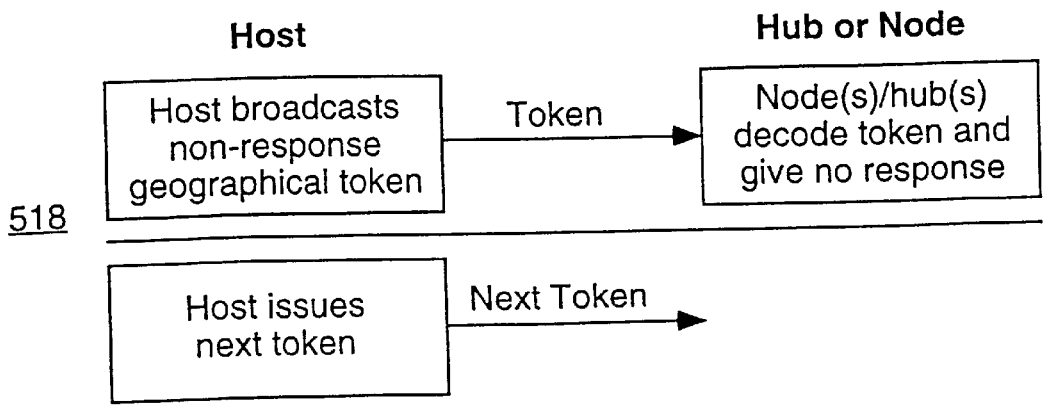
FIGS. 18a–18c illustrate one embodiment of connection management transaction protocols.
Figure 18B:
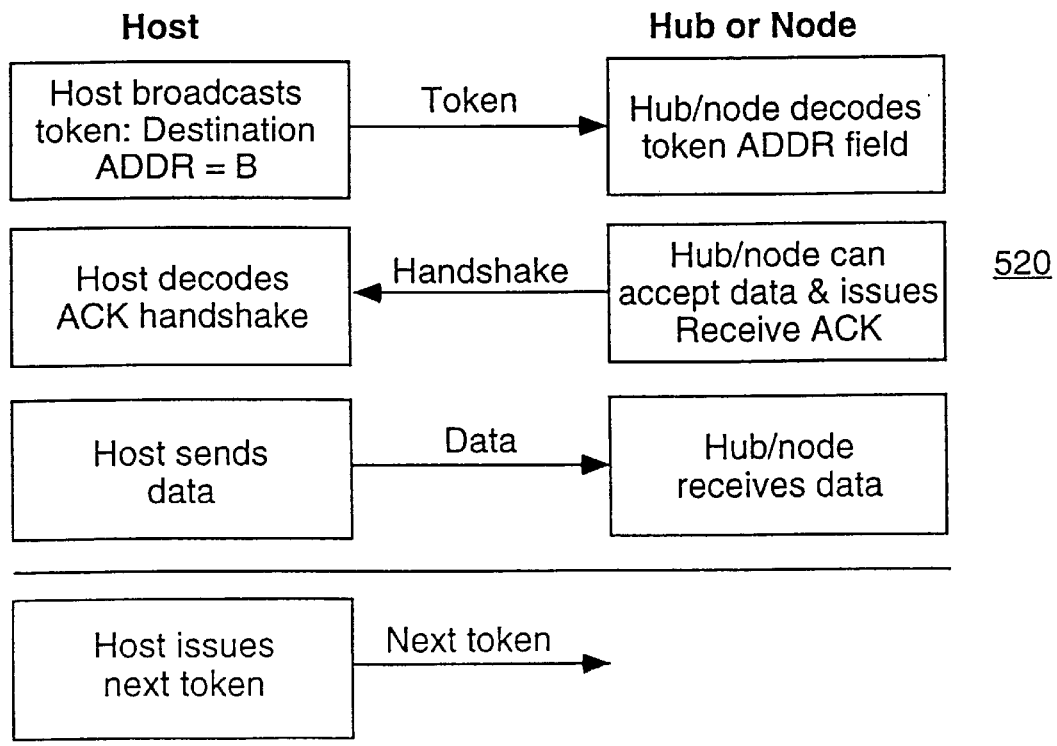
Figure 18C:
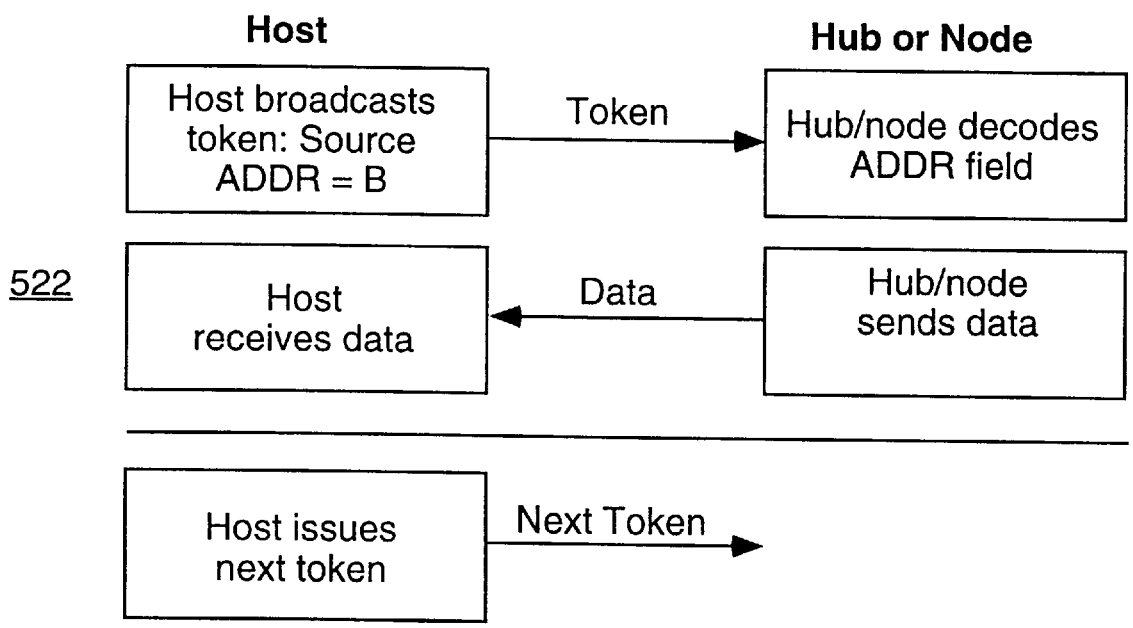
Figure 19A:
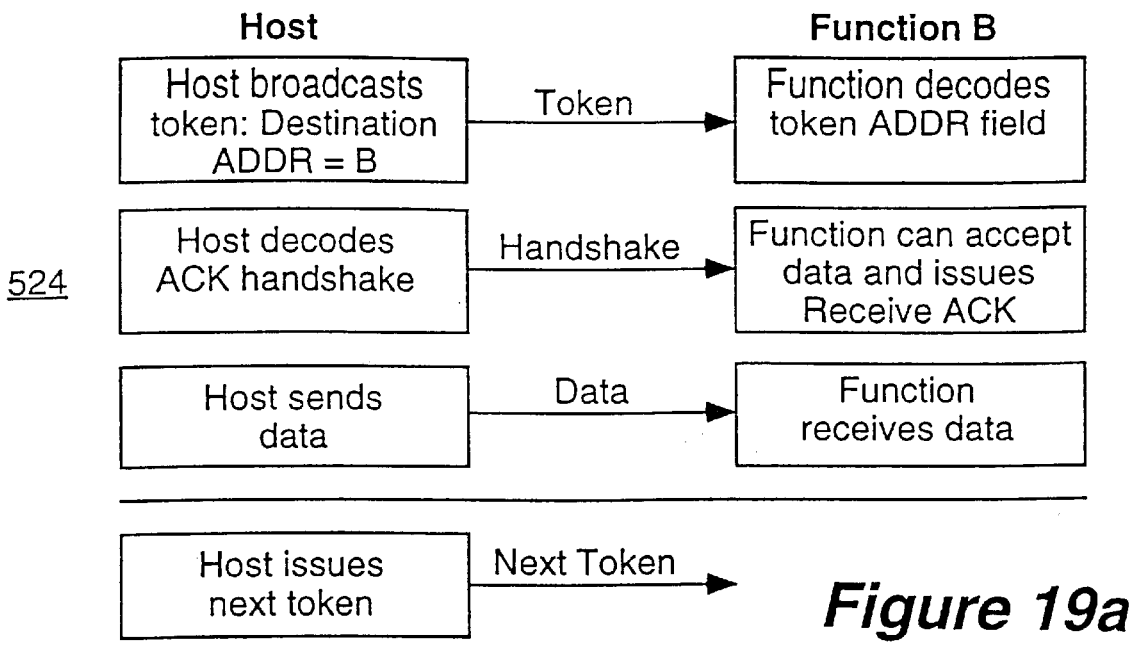
Figure 19B:
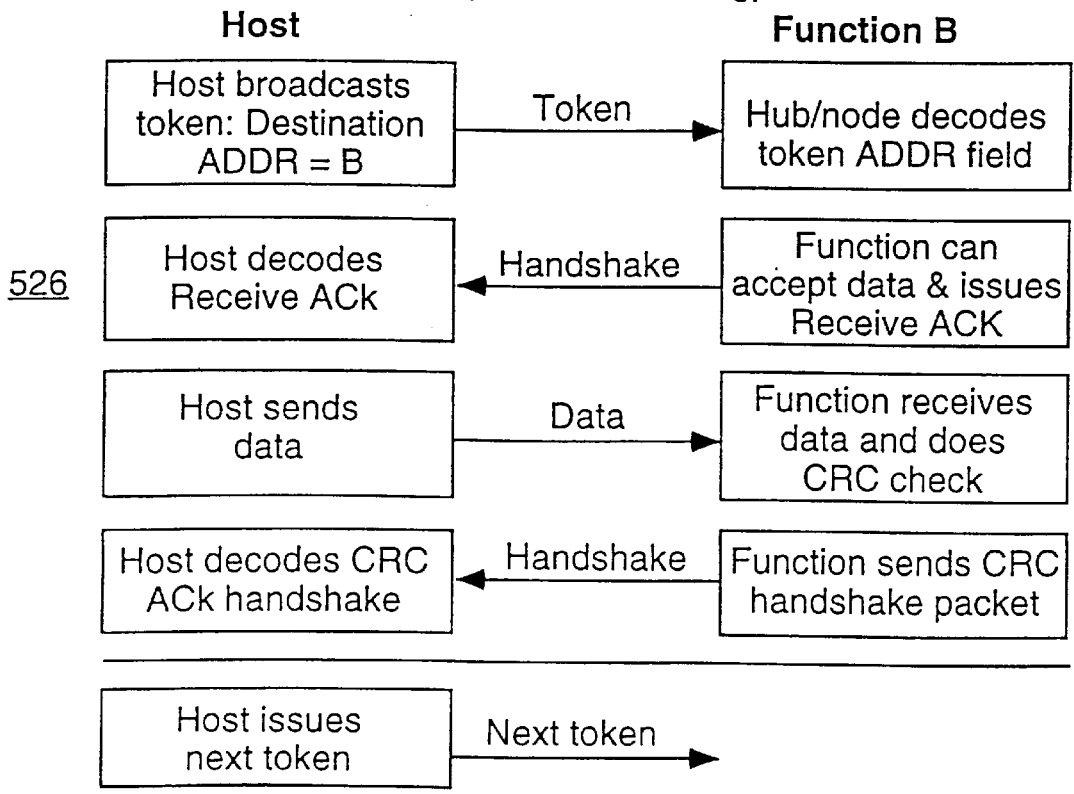
Figure 19C:
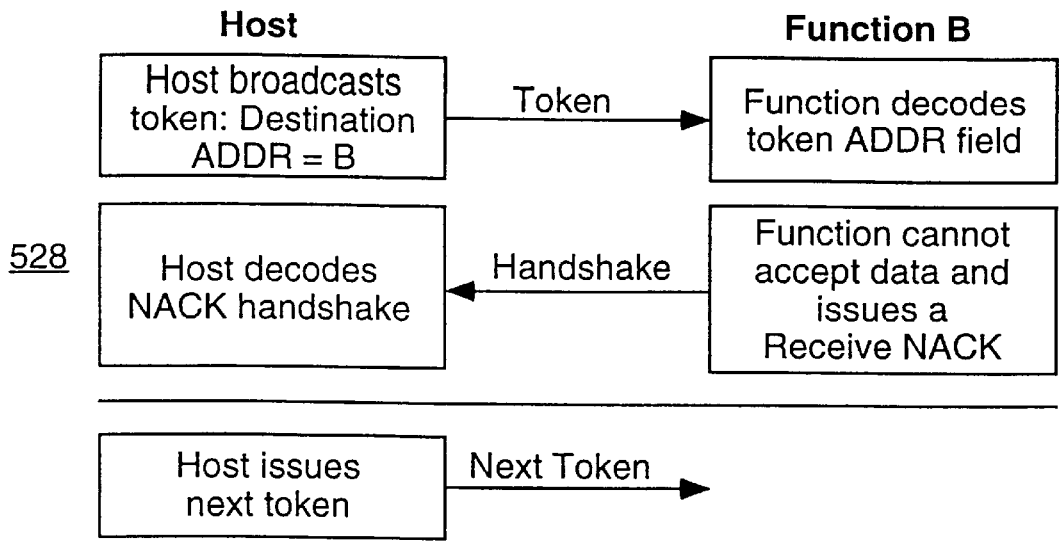
Figure 19D:
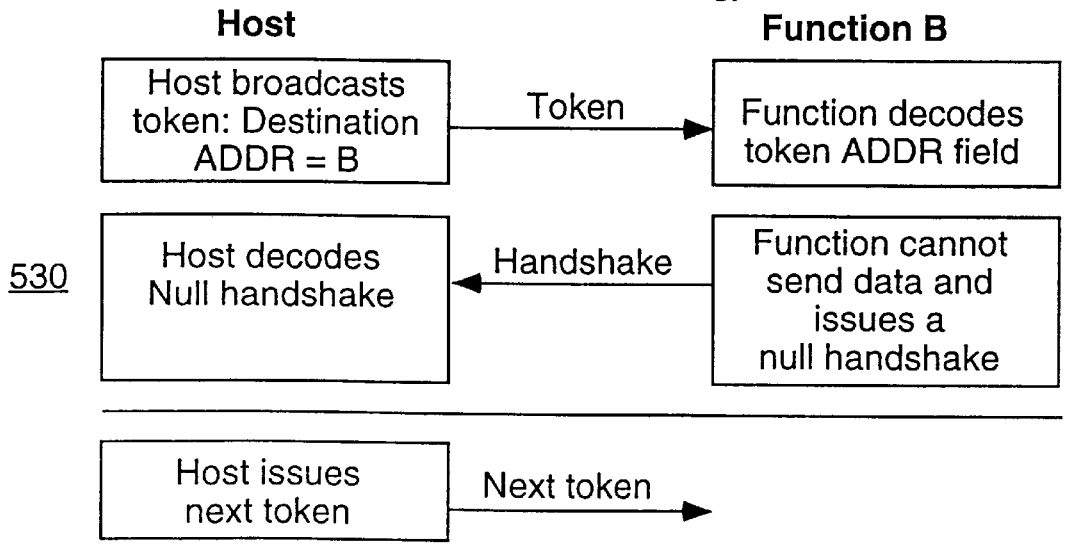
Figure 19E:
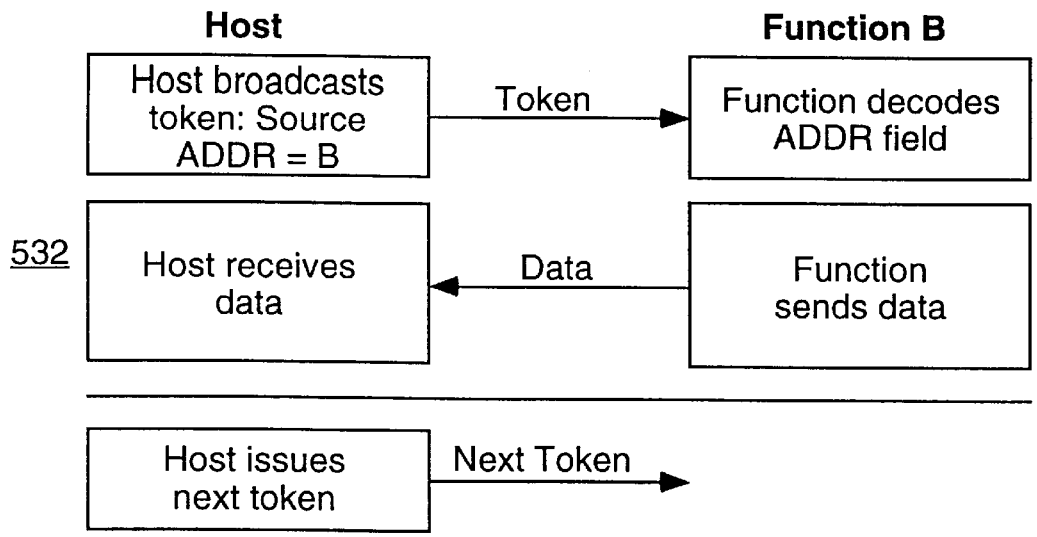
Figure 19F:
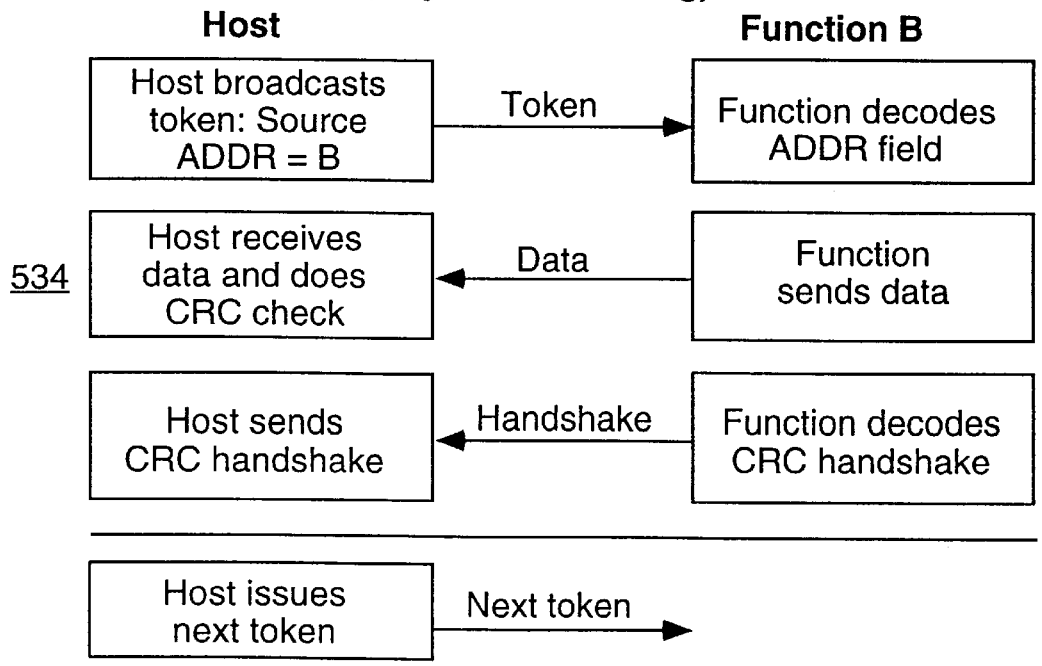
Figure 19G:
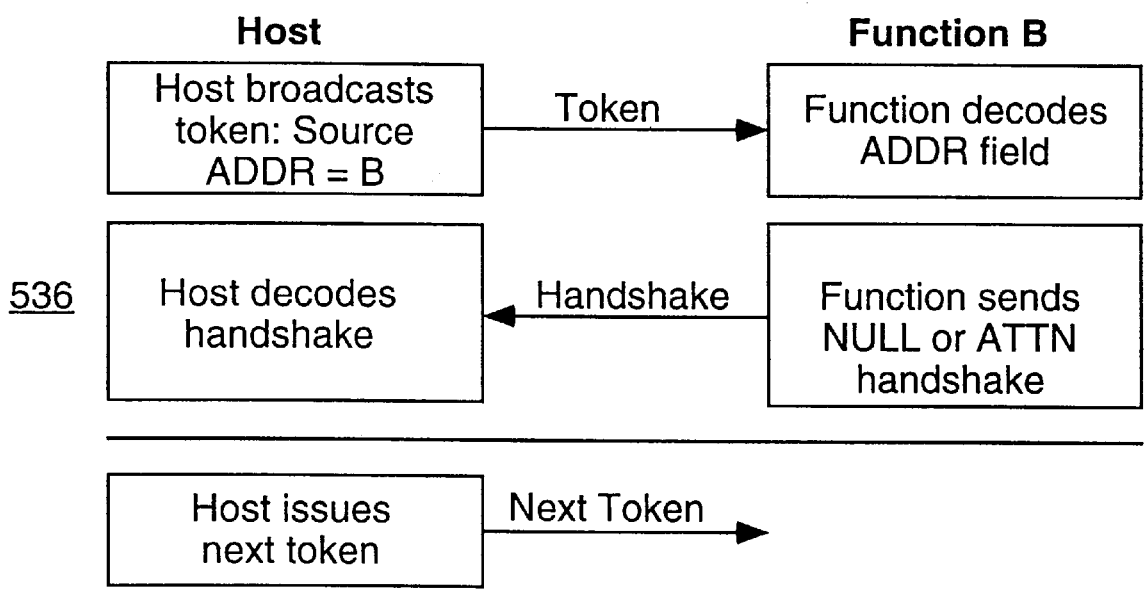
Figure 19I:
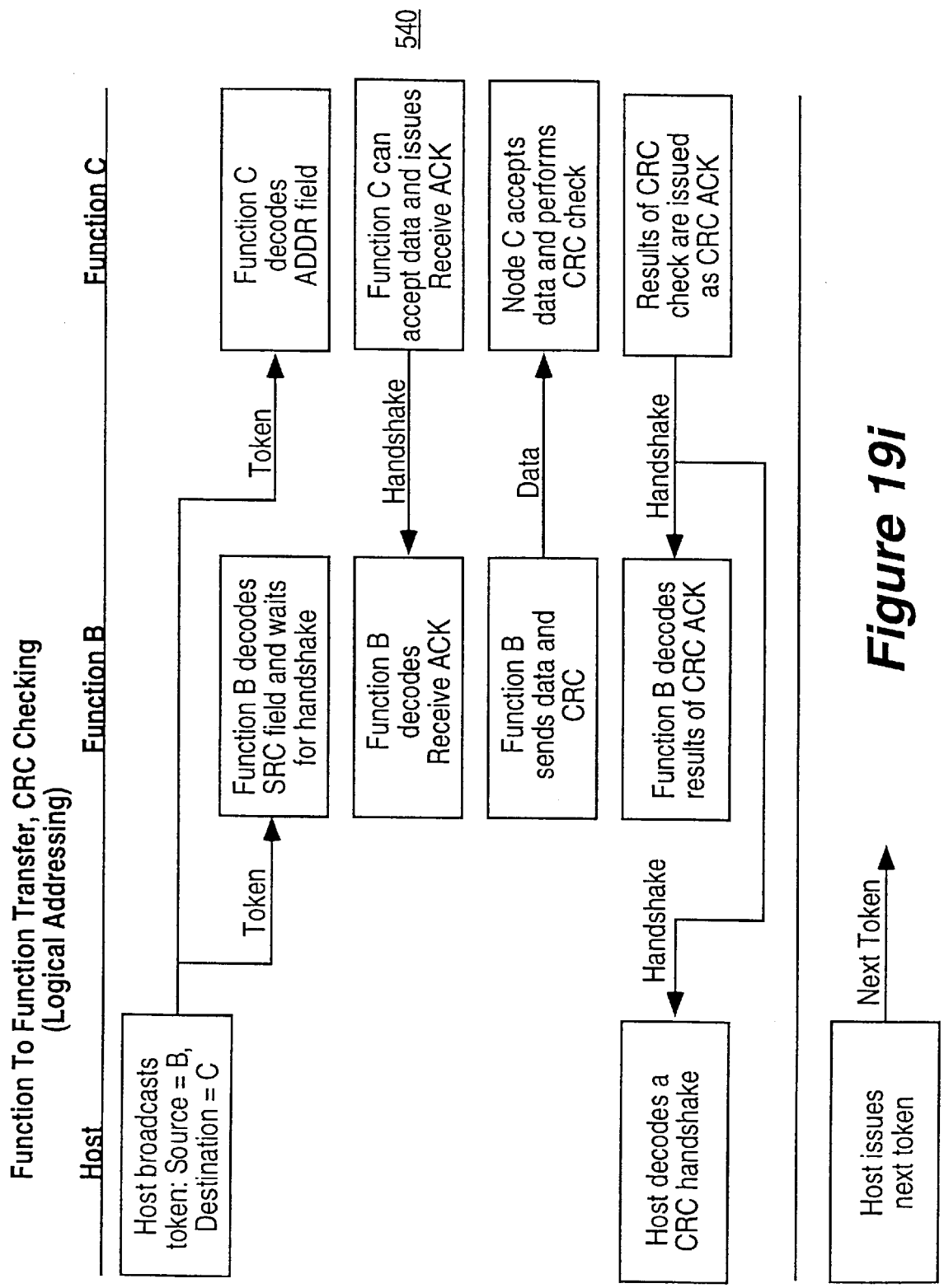
Figure 19J:
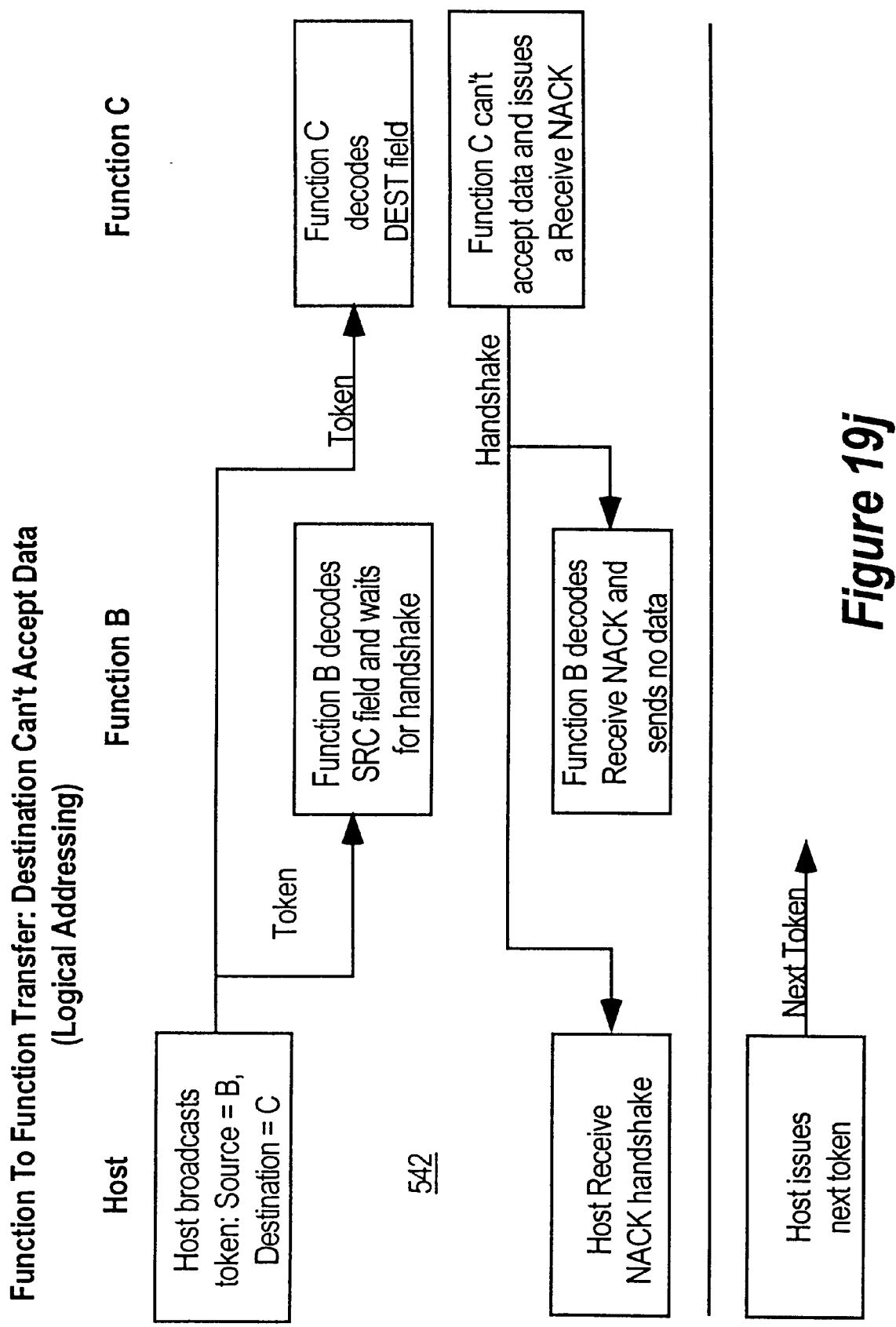
Figure 19K:
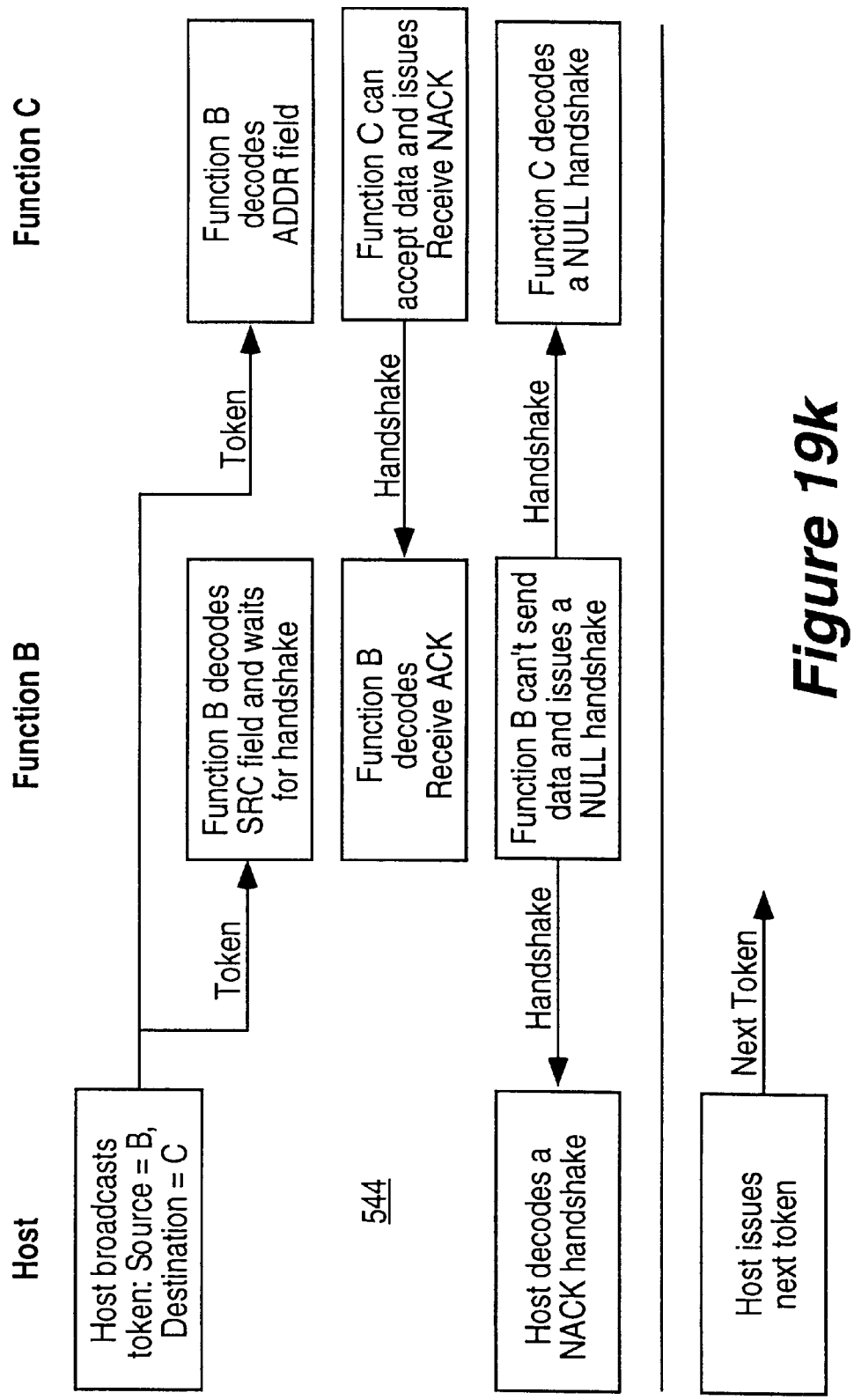

FIGS. 18a–18c illustrate one embodiment of connection management transaction protocols. As shown, for the illustrated embodiment, connection management transaction protocols include a non-responsive geographical transfer protocol 518, a responsive geographical write transfer protocol 520, and a responsive geographical read transfer protocol 522. Under the non-responsive geographical transfer protocol 518, the bus controller 14 broadcasts a non-responsive geographical token packet Each interconnected bus signal distributor 18 or bus interface 22 decodes the token packet and provides no response. Under the responsive geographical write transfer protocol 520, the bus controller 14 broadcasts a geographical token packet having a destination address. Each bus signal distributor 18 or bus interface 22 decodes the token packet. If the addressed bus signal distributor 18 or bus interface 22 can accept data, it transmits an acknowledgment handshake packet. The bus controller 12 decodes the acknowledgment handshake packet, and sends the data. The addressed bus signal distributor 18 or bus interface 22 then accepts the data. Under the responsive geographical read transfer protocol 522, the bus controller 14 broadcasts a geographical token packet having a destination address. Each bus signal distributor 18 or bus interface 22 decodes the token packet. If the addressed bus signal distributor 18 or bus interface 22 can send data, it transmits the data. The bus controller 12 then accepts the data.

FIGS. 19a–19k illustrate one embodiment of data communication transaction protocols. As shown, for the illustrated embodiment, data communication transaction protocols include host-function transfer protocols for sending and accepting data, with or without CRC checking, 524–534, host sending attention request protocol 536, and function-function transfer protocols for sending and accepting data, with or without CRC checking 538. For example, under the host-function accept data no CRC checking protocol 524, the bus controller 14 broadcasts a logically addressed token packet having a destination address. Each function decodes the token packet. If the function can accept data, it transmits an acknowledgment handshake packet. The bus controller 12 decodes the acknowledgment handshake packet, and sends the data. The function then accepts the data. As a further example, under the host sending attention request protocol 536, the bus controller 14 broadcasts a logically addressed token packet having a destination address. Each function decodes the token packet. The function then transmits a NULL or ATIN handshake packet. The bus controller 12 decodes the NULL or ATIN handshake packet. As yet another example, under the host-function accept data no CRC checking protocol 538, the bus controller 14 broadcasts a logically addressed token packet having a source and a destination address. Each function decodes the token packet. The source function waits for an acknowledgment handshake packet, whereas if the destination function can accept data, it transmits an acknowledgment handshake packet to the source function. The source function decodes the acknowledgment handshake packet, and sends the data. The destination function then accepts the data.

Figure 20:
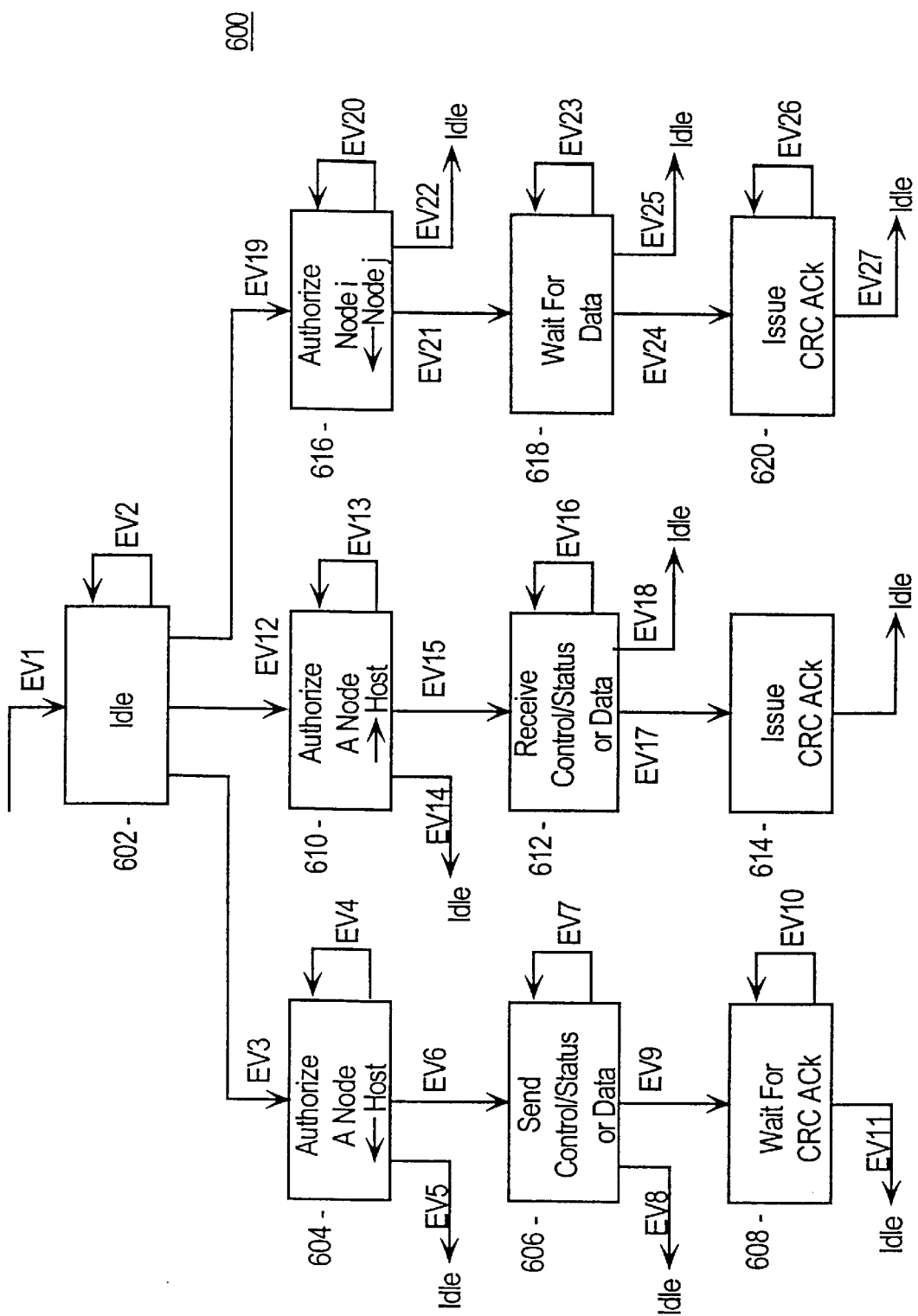
FIG. 20 illustrates one embodiment of a state machine provided to the bus controller for implementing the above described protocols.

FIG. 20 illustrates one embodiment of a state machine 600 provided to the bus controller 14 for implementing the above described protocols. State machine 600 comprises ten states 602–620 and twenty seven state transitional rules or events (EV1–EV27).

At power on or reset (EV1), state machine 600 enters idle state 602, and stays in idle state 602, as long as there is no transaction to be conducted among bus controller 14, bus signal distributor 18, and bus interfaces 22 (including the functions interfaced), and it is not time to poll the next bus signal distributor 18, bus interface 22 or function (EV2).

On the other hand, if it is time to poll, and there is at least one transaction to be performed (EV3, EV12 or EV19), state machine 600 enters either the state of authorizing a transaction from the bus controller 14 to a function, state 604, or authorizing a transaction from a function to bus controller 14, state 610, or authorizing a transaction between two functions, state 616, depending on the nature of the transaction to be performed.

While in state 604, state machine 600 authorizes a function to receive data from bus controller 14. State machine 600 then either stays in the state if a reply with respect to the readiness of the function to accept data has not been received, and time for receiving the reply has not expired (EV4), or returns to idle state 602 if the function replies that it cannot accept data, or time for receiving reply has expired (EV5), or enters the state of sending control/status or data 606, if the function replies to the effect that it is ready to accept data (EV6).

While in state 606, state machine 600 sends data to the destination function. State machine 600 then either stays in the state if indication denoting whether CRC checking is to be performed has not been output yet, and time for outputting the indication has not expired (EV7), or returns to idle state 602 if indication denoting no CRC checking has been output, or time for outputting the indication has expired (EV8), or enters the state of waiting for CRC acknowledgment 608 if indication denoting CRC has been output.

While in state 608, state machine 600 waits for the CRC checking results. State machine 600 either stays in the state if the destination function has not replied with either CRC pass or failed, and time for reply has not expired (EV10), or returns to idle state 602 if the destination function has replied with either CRC pass or CRC failed, or time for reply has expired (EV11).

While in state 610, state machine 600 authorizes a source function to send data to bus controller 14. State machine 600 then either stays in the state if the source function has provided neither data or a null, and time for providing data/null has not expired (EV13), or returns to idle state 602 if the source function has provided a null, or time for providing data or a null has expired (EV14), or enters the state of receiving control/status or data 612, if the source function has provided a data packet (EV15).

While in state 612, state machine 600 completes the transaction. State machine 600 then either stays in the state if source function has output an indication on whether CRC checking is necessary or not, and time for outputting the indication has not expired (EV16), or returns to idle state 602 if the source function has output an indication of no CRC checking, or time for outputting the indication has expired (EV18), or enters the state of issuing CRC acknowledgment 614 if the source function has outputting an indication of CRC checking (EV17).

While in state 614, state machine 600 issues the CRC acknowledgment and then returns to idle state 602.

While in state 616, state machine 600 authorizes a source function to send data to a destination function. State machine 600 then either stays in the state if the destination function has not responded with a "can accept data" or "cannot accept data" response, and time for providing the response has not expired (EV20), or returns to idle state 602 if the destination function responded with "cannot accept data" or time to respond has expired (EV22), or enters the state waiting for data 618, if the destination function responded with "can accept data" (EV21).

While in state 618, state machine 600 waits for data transfer from the source function to the destination function to complete. State machine 600 then either stays in the state if indication for CRC or no CRC checking has not been output by the source function, and time for outputting such indication has not expired (EV23), or returns to idle state 602 if indication for no CRC checking has been output, or time for outputting the indication has expired (EV25), or enters the state of issuing CRC acknowledgment 620 if indication for CRC checking has been output by the source function (EV24).

While in state 620, state machine 600 monitors for issuance of a CRC acknowledgment by the destination function. State machine 600 stays in the state if the destination function has not output either CRC pass or CRC failed, and time for outputting CRC pass/failed has not expired (EV26), or returns to idle state 602 if the destination function has output either CRC pass or failed (EV27).

Figure 21:
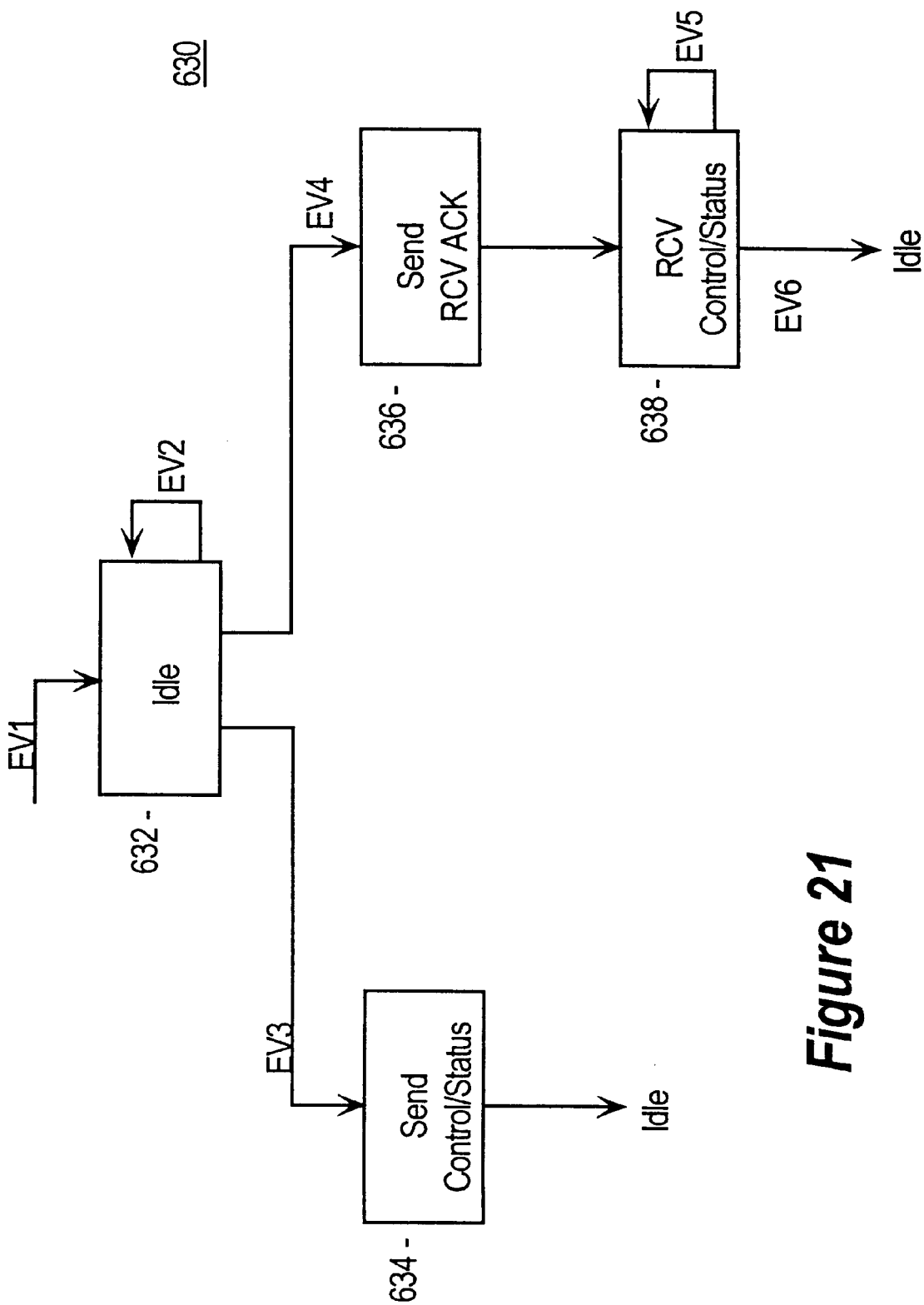
FIG. 21 illustrates one embodiment of a state machine provided to a bus signal distributor for implementing the above described protocols.

FIG. 21 illustrates one embodiment of a state machine 630 provided to a bus signal distributor 18 for implementing the above described protocols. State machine 630 comprises four states 632–638 and six state transitional rules or events (EV1–EV6).

At power on or reset (EV1), state machine 630 enters idle state 632. State machine 630 either stays in idle state 632 if bus signal distributor 18 is not addressed (geographically) (EV2). Otherwise, state machine 630 either enters the state of sending control/status, state 634, or the state of sending receive acknowledgment, state 636, if bus signal distributor 18 is addressed (geographically), depending on the reason it is addressed (geographically).

State machine 630 enters state 634 if it receives a query/configuration verify request (EV3). While in state 634, bus signal distributor 18 replies with the requested information, and then returns to idle state 632. State machine 630 enters state 636 if it receives an instruction from bus controller 14 to receive control/status (EV4). While in state 634, bus signal distributor 18 replies with an acknowledgment, and then enters the state of receiving control/status, state 638. While in state 634, state machine 603 either remains in the state if it has not received the control/status from bus controller 14, and time to receive the control/status has not expired (EV5), or returns to idle state 632 if the control/status has been received or the time to receive has expired (EV6).

Figure 22:
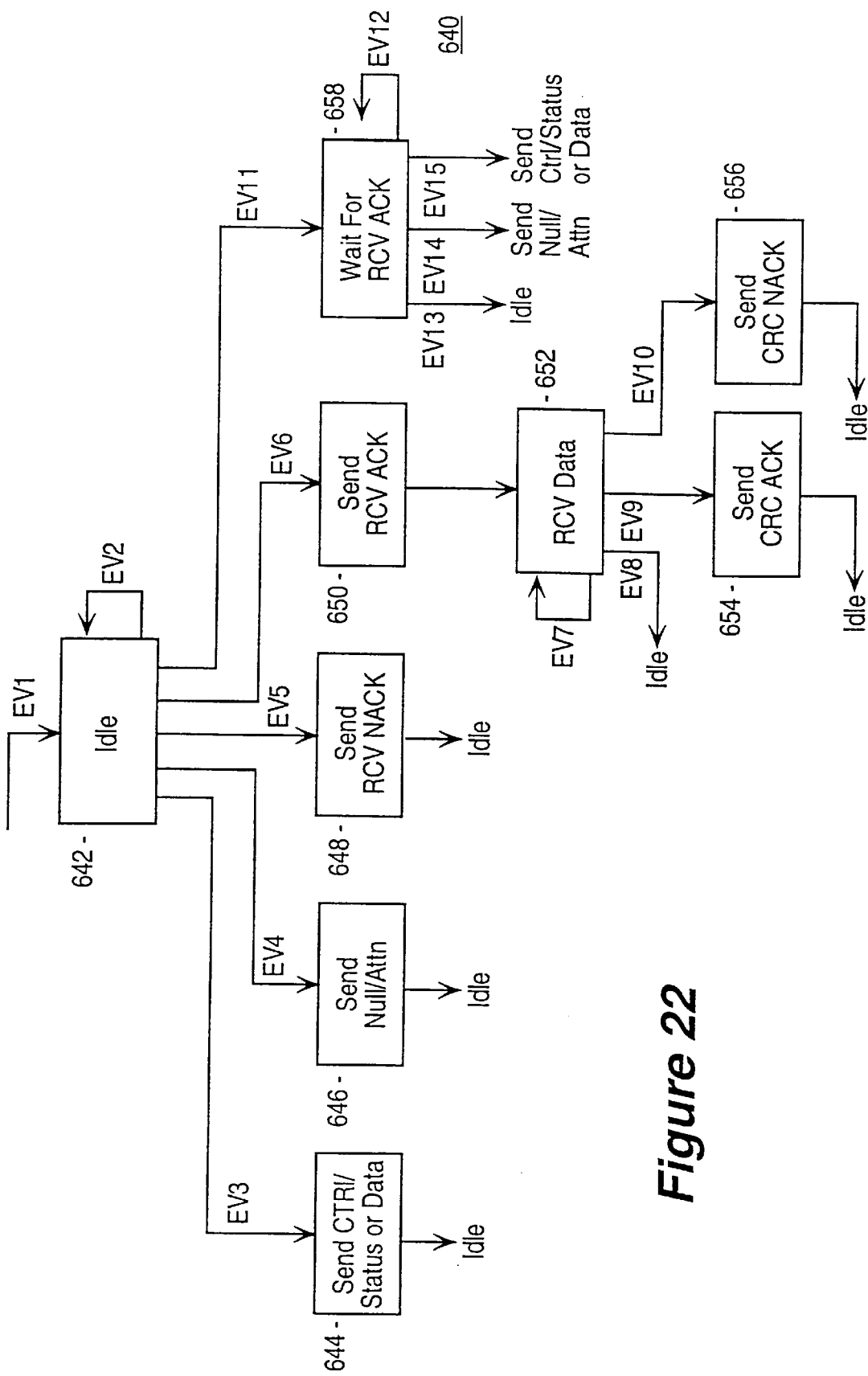
FIG. 22 illustrates one embodiment of a state machine provided to a bus interface for implementing the above described protocols.

FIG. 22 illustrates one embodiment of a state machine 640 provided to a bus interface 22 for implementing the above described protocols. State machine 640 comprises nine states 642–658 and fifteen state transitional rules or events (EV1–EV15).

At power on or reset (EV1), state machine 640 enters idle state 642. State machine 640 either stays in idle state 642 if bus interface 22 is not addressed (logically) for transactions or addressed (logically) but no response is required (EV2). Otherwise, state machine 640 either enters the state of sending control/status or data, state 644, or the state of sending null/attention, state 646, or the state of sending "cannot accept data", state 648, or the state of sending "can accept data", state 650, or the state of waiting for a "can accept data" reply, state 658, if bus interface 22 is addressed (logically), depending on the reason it is addressed (logically).

State machine 640 enters state 644 if it is addressed (logically) for a function to bus controller 14 transaction, and the addressed function is ready to transmit (EV3). While in state 644, bus interface 22 sends the requested control/status or data, and then returns to idle state 642. State machine 640 enters state 646 if it is addressed for a function to bus controller 14 transaction and the addressed function is not ready to transmit (EV4). While in state 646, bus interface 22 sends a null/attention reply, and then returns to idle state 642.

State machine 640 enters state 648 if it is addressed for a bus controller 14 to function transaction and the addressed function cannot accept data (EV5). While in state 648, bus interface 22 sends a "cannot accept data" reply, and then returns to idle state 642. State machine 640 enters state 650 if it is addressed for a bus controller 14 to function transaction and the addressed function "can accept data" (EV6). While in state 650, bus interface 22 sends a "can accept data" reply, and then enters the state of receiving data, state 652.

While at state 652, state machine 640 receives data. State machine 640 either remains in the state if bus controller 14 has not output an indication for CRC or no CRC checking, and time for outputting the indication has not expired (EV7), or returns to idle state 642 if all data has been received, or time for receiving data has expired (EV8), or enters the state of sending CRC pass, state 654, if CRC pass is to be replied, and time to reply has not expired (EV9), or enters the state of sending CRC failed, state 656, if CRC failed is to be replied, and time to reply has not expired (EV10).

State machine 640 enters state 658 if bus interface 22 is addressed (logically) as a source for a function to function transaction (EV11). While in state 658, state machine 640 remains in the state if no "can accept data" or "cannot accept date" has been received, and time for receiving the reply has not expired (EV12), or simply returns the idle state 642 if either the destination function replied with "cannot accept data", or time for receiving the reply has expired (EV13), or returns to idle state 642 after sending null/attention first if the destination function replied with "can accept data" but the source function is not ready to transmit, and time for sending data has not expired (EV14), or returns to idle state 642 after sending control/status or data first if the destination function replied with "can accept data", the source function is ready to transmit, and time for sending the reply has not expired (EV15).

Thus, a method and apparatus for exchanging data, status and commands between serial bus elements of an hierarchy serial bus assembly using communication packets has been described. For additional information about the method and apparatus of the present invention, refer to the enclosed Appendices.

While the present invention has been described in terms of the above embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. A computer system comprising:
   a plurality of multi-media peripheral devices, each having one or more multi-media functions and a bus interface;
   a system unit including a processor and a bus controller; and
   one or more bus signal distributors hierarchically coupling the multi-media peripheral devices, through their bus interfaces, to the system unit, through its bus controller, with each bus interface directly coupled to a bus signal distributor, and each bus signal distributor coupled to another bus signal distributor, except for one of the one or more bus signal distributors, which is directly coupled to the bus controller;
   the bus controller of the system unit further including logic to serially formulate and transmit token packets of at least a first and a second type to the one or more bus signal distributors and the one or more bus interfaces of the multi-media peripheral devices, to serially authorize management and data transactions with selected ones of the bus signal distributor(s), the bus interfaces, and the multi-media functions,
   the management transactions being used for dynamically configuring the bus controller, the one or more bus signal distributors and the one or more bus interfaces in accordance with the manner in which the bus controller, the one or more bus signal distributors and the one or more bus interfaces are coupled to each other,
   each token packet having identification information identifying whether the token packet is of the first or the second type, and first address information,
   each token packet of the first type being used to authorize either one of the one or more bus signal distributors or one of the one or more bus interfaces to conduct a management transaction with the bus controller, and the first address information of each token packet of the first type being decoded in a partitioned manner including a first portion for identifying a bus signal distributor, and a second portion for identifying either the identified bus signal distributor as the authorized bus signal distributor, or a bus interface coupled to the identified bus signal distributor as the authorized bus interface,
   each token packet of the second type being used to authorize a first multi-media function to conduct a data transaction with the bus controller, and the first address information of each token packet of the second type being decoded in an unpartitioned manner for identifying the first authorized multi-media function.

2. The computer system as set forth in claim 1, wherein the bus controller of the system unit further comprises logic to serially exchange data packets of a first type with the authorized bus signal distributors/interfaces and data packets of a second type with the authorized multi-media functions,
   each data packet having identification information identifying whether the data packet is of the first or the second type, and second address information,
   the second address information of each data packet of the first type being decoded in the first partitioned manner for identifying the authorized bus signal distributor/interface, and
   the second address information of each data packet of the second type being decoded in the second unpartitioned manner for identifying the authorized multi-media function.

3. The computer system as set forth in claim 1, wherein the identification information of each token packet identifies the token packet as the first, the second or a third type instead, and each token packet further includes second address information,
   the bus controller of the system unit further comprises logic to serially formulate and transmit token packets of the third type to the multi-media functions to serially authorize data transactions to be conducted between selected twos of the multi-media functions,
   both the first and the second address information of each token packet of the third type being decoded in the second unpartitioned manner for identifying two multi-media functions as the authorized multi-media functions of the data transaction.

4. The computer system as set forth in claim 3, wherein the bus controller of the system unit further comprises logic to serially exchange data packets of a first type with the authorized bus signal distributors/interfaces and data packets of a second type with the authorized multi-media functions,
   each data packet having identification information identifying whether the data packet is of the first or the second type, and at least third address information, the at least third address information of each data packet of the first type being decoded in the first partitioned manner for identifying the authorized bus signal distributor/interface, and the at least third address information of each data packet of the second type being decoded in the second unpartitioned manner for identifying at least one multi-media function as the authorized multi-media function.

5. A computer system comprising:

a plurality of multi-media peripherals, each having one or more multi-media functions and a bus interface;

a system unit having a processor and a bus controller; and one or more bus signal distributors hierarchically coupling the multi-media peripheral devices, through their bus interfaces, to the system unit, through its bus controller, with each bus interface directly coupled to a bus signal distributor, and each bus signal distributor coupled to another bus signal distributor, except for one of the one or more bus signal distributors, which is directly coupled to the bus controller;

each bus signal distributor including logic to serially receive token packets of at least a first and a second type from the bus controller, and conditionally forward the received token packets to a selected one of the other bus signal distributors coupled to the bus signal distributor or a selected one of the bus interfaces coupled to the bus signal distributor, to serially facilitate authorization by the bus controller of management and data transactions between the bus controller and selected ones of the bus signal distributor(s), the bus interfaces and the multi-media functions, the management transactions being used for dynamically configuring the bus controller, the one or more bus signal distributors and the one or more bus interfaces in accordance with the manner in which the bus controller, the one or more bus signal distributors and the one or more bus interfaces are coupled to each other;

each token packet having identification information identifying whether the token packet is of the first or the second type, and first address information, each token packet of the first type being used to authorize either one of the bus signal distributors or one of the one or more bus interfaces to conduct a management transaction with the bus controller, and the first address information of each token packet of the first type being decoded in a partitioned manner including a first portion for identifying a bus signal distributor, and a second portion for identifying either the identified bus signal distributor as the authorized bus signal distributor or a bus interface coupled to the identified bus signal distributor as the authorized bus interface, each token packet of the second type being used to authorize a multi-media function to conduct a data transaction with the bus controller, and the first address information of each token packet of the second type being decoded in an unpartitioned manner for identifying the first authorized multi-media function.

6. The computer system as set forth in claim 5, wherein each bus signal distributor further comprises logic to serially exchange data packets of a first type with the bus controller, and to facilitate exchanges of data packets of the first type between the bus controller and other authorized bus signal distributors/interfaces, as well as data packets of a second type between the bus controller and the authorized multi-media functions, each data packet having identification information identifying whether the data packet is of the first or the second type, and second address information, the second address information of each data packet of the first type being decoded in the first manner for identifying the authorized bus signal distributor/interface, and the second address information of each data packet of the second type being decoded in the second unpartitioned manner for identifying the authorized multi-media function.

7. The computer system as set forth in claim 5, wherein the identification information of each token packet identifies the token packet as the first, the second or a third type instead, and each token packet further includes second address information, the bus signal distributor further comprises logic to serially receive and forward token packets of the third type to the multi-media functions to serially facilitate authorization by the bus controller for data transactions between the first authorized multi-media function and a second authorized multi-media function, both the first and the second address information of each token packet of the third type being decoded in the second unpartitioned manner for identifying two authorized multi-media functions.

8. The computer system as set forth in claim 7, wherein the bus signal distributor further comprises logic to serially exchange data packets of a first type with the bus controller, and to facilitate exchanges of data packets of the first type between the bus controller and other authorized bus signal distributors/interfaces, as well as data packets of a second type between the bus controller and the authorized multi-media functions or between authorized multi-media functions, each data packet having identification information identifying whether the data packet is of the first or the second type, and at least third address information, the at least third address information of each data packet of the first type being decoded in the first partitioned manner for identifying the bus signal distributor or an authorized bus interface, and the at least third address information of each data packet of the second type being decoded in the second unpartitioned manner for identifying at least one authorized multi-media function.

9. A computer system comprising:

a plurality of multi-media peripherals, each having one or more multi-media functions and a bus interface;

a system unit having a processor and a bus controller; and one or more bus signal distributors hierarchically coupling the multi-media peripheral devices, through their bus interfaces, to the system unit, through its bus controller, with each bus interface directly coupled to a bus signal distributor, and each bus signal distributor coupled to another bus signal distributor, except for one of the one or more bus signal distributors, which is directly coupled to the bus controller;

each bus interface including logic to serially receive token packets of at least a first and a second type from the bus controller, to serially facilitate authorization by the bus controller of management and data transactions between the bus controller and selected ones of the bus interfaces and the multi-media functions, the management transactions including configuration transactions for dynamically configuring the bus interfaces, the bus signal distributor(s), and the bus controller in accordance with the manner in which the bus interfaces, the bus signal distributor(s) and the bus controller are coupled to each other, each token packet having identification information identifying whether the token packet is of the first or the second type, and first address information, each token packet of the first type being used to authorize either a bus signal distributor or a bus interface to conduct a management transaction with the bus controller, and the first address information of each token packet of the first type being decoded in a partitioned manner including a first portion for identifying a bus signal distributor, and a second portion for identifying either the identified bus signal distributor as the authorized bus signal distributor, or one of the bus interfaces coupled to identified bus signal distributor as the authorized bus interface, each token packet of the second type being used to authorize a multi-media function to conduct a data transaction with the bus controller, and the first address information of each token packet of the second type being decoded in an unpartitioned manner for identifying the first authorized multi-media function.

10. The computer system as set forth in claim 9, wherein each bus interface further comprises logic to serially exchanging data packets of a first type with the bus controller, or to facilitate exchanges of data packets of a second type between the bus controller and the authorized multi-media functions, each data packet having identification information identifying whether the data packet is of the first or the second type, and second address information, the second address information of each data packet of the first type being decoded in the first partitioned manner for identifying the bus signal distributor/interface, and the second address information of each data packet of the second type being decoded in the second unpartitioned manner for identifying the authorized multi-media function.

11. The computer system as set forth in claim 9, wherein the identification information of each token packet identifies the token packet as the first, the second, or a third type instead, and each token packet further includes second address information, the bus interface further comprises logic to serially receive token packets of the third type to serially facilitate authorization by the bus controller for data transactions between the authorized multi-media functions, both the first and the second address information of each token packet of the third type being decoded in the second unpartitioned manner for identifying two authorized multi-media functions.

12. The computer system as set forth in claim 11, wherein each bus interface further comprises logic to serially exchange data packets of a first type with the bus controller, or to facilitate exchanges of data packets of a second type between the bus controller and authorized multi-media functions, and between authorized multi-media functions, each data packet having identification information identifying whether the data packet is of the first or the second type, and at least third address information, the at least third address information of each data packet of the first type being decoded in the first partitioned manner for identifying the bus interface, and the at least third address information of each data packet of the second type being decoded in the second unpartitioned manner for identifying at least one authorized multi-media function.

* * * * *

UNITED STATES PATENT AND TRADEMARK OFFICE
CERTIFICATE OF CORRECTION

PATENT NO. : 5,909,556 Page 1 of 1
DATED : June 11, 1999
INVENTOR(S) : Morriss et al.

It is certified that error appears in the above-identified patent and that said Letters Patent is hereby corrected as shown below:

Column 11,
Line 60, after "packet", insert -- . --.

Column 12,
Lines 31 and 32, delete "ATIN" and insert -- ATTN --.

Signed and Sealed this

Twenty-ninth Day of June, 2004

JON W. DUDAS
*Acting Director of the United States Patent and Trademark Office*